United States Patent [19]

Crandall et al.

[11] Patent Number: 5,165,012

[45] Date of Patent: Nov. 17, 1992

[54] CREATING REMINDER MESSAGES/SCREENS, DURING EXECUTION AND WITHOUT ENDING CURRENT DISPLAY PROCESS, FOR AUTOMATICALLY SIGNALLING AND RECALLING AT A FUTURE TIME

[75] Inventors: Richard L. Crandall; Dorothy A. Lieffers; Thomas P. Beyer, all of Ann Arbor; Paul E. Hansknecht, Northville; James K. Eschman, Ann Arbor, all of Mich.

[73] Assignee: Comshare Incorporated, Ann Arbor, Mich.

[21] Appl. No.: 422,506

[22] Filed: Oct. 17, 1989

[51] Int. Cl.⁵ ............................................. G06F 15/62
[52] U.S. Cl. ................................. 395/100; 364/230.6; 364/237.5; 364/281.7; 364/927.7; 364/943; 364/943.5; 340/706; 395/156; 395/157; 395/159; 395/161; 395/144; 395/145; 395/147; 395/148; 395/149
[58] Field of Search ...................... 364/200, 900, 518; 379/354; 340/706

[56] References Cited

U.S. PATENT DOCUMENTS

| | | | |
|---|---|---|---|
| 4,079,449 | 3/1978 | Mercurio et al. | 364/200 |
| 4,458,331 | 7/1984 | Amezcua et al. | 364/900 |
| 4,555,775 | 11/1985 | Pike | 364/900 |
| 4,626,836 | 12/1986 | Curtis et al. | 340/706 |
| 4,752,893 | 6/1988 | Guttag et al. | 364/518 |
| 4,782,521 | 11/1988 | Bartlett et al. | 379/354 |
| 4,819,191 | 4/1989 | Scully et al. | 364/518 |
| 4,881,179 | 11/1989 | Vincent | 364/518 |
| 4,977,520 | 12/1990 | McGaughey, III et al. | 364/521 |
| 5,023,851 | 6/1991 | Murray et al. | 368/41 |

OTHER PUBLICATIONS

Comshare Commander Executive Information System Guide, 1987; Ser. No. 277094, pp. 1-12.
Comshare Commander Executive's Guide; Dec. 1987; Ser. No. 290208.
Comshare Commander Executive's Guide; Aug. 1988; Ser. No. 313365.
Comshare Commander EIS Brochure; May 23, 1989; Ser. No. 342332.
Multi-Dimensionality in a Decision Support System; 1983; Ser. No. 160645, pp. 1-12.
What Makes System W Different?; 1988; Ser. No. 324238, pp. 1-10.
What is Commander EIS?; Ser. No. 271450, 1987.
Commander ® EIS with Execu-View TM; Ser. No. 230697.
"Strategic Information at Your Fingertips"; 1986, one page.
Cambell Services Inc.; "Remainder TM Time Management and Follow-Up System"; Jun. 1986; Index #0126881.
Comshare Inc.; "Redi-Mail, Reminder"; May 16, 1989, Index #0227119.

Primary Examiner—Thomas C. Lee
Assistant Examiner—Krisna Lim
Attorney, Agent, or Firm—Finnegan, Henderson, Farabow, Garrett & Dunner

[57] ABSTRACT

A software reminder procedure that allows a user to save a display screen displayed by a currently executing process as part of a reminder message for later recall. The reminder message can be saved without exiting or ending the currently executing process. The display (and therefore the reminder) can be text, electronic mail messages, graphic screen displays, single screen displays, or multiple screen displays. Certain types of reminders are automatically updated when the data from which they were created is updated, so that a most current version is always displayed.

22 Claims, 26 Drawing Sheets

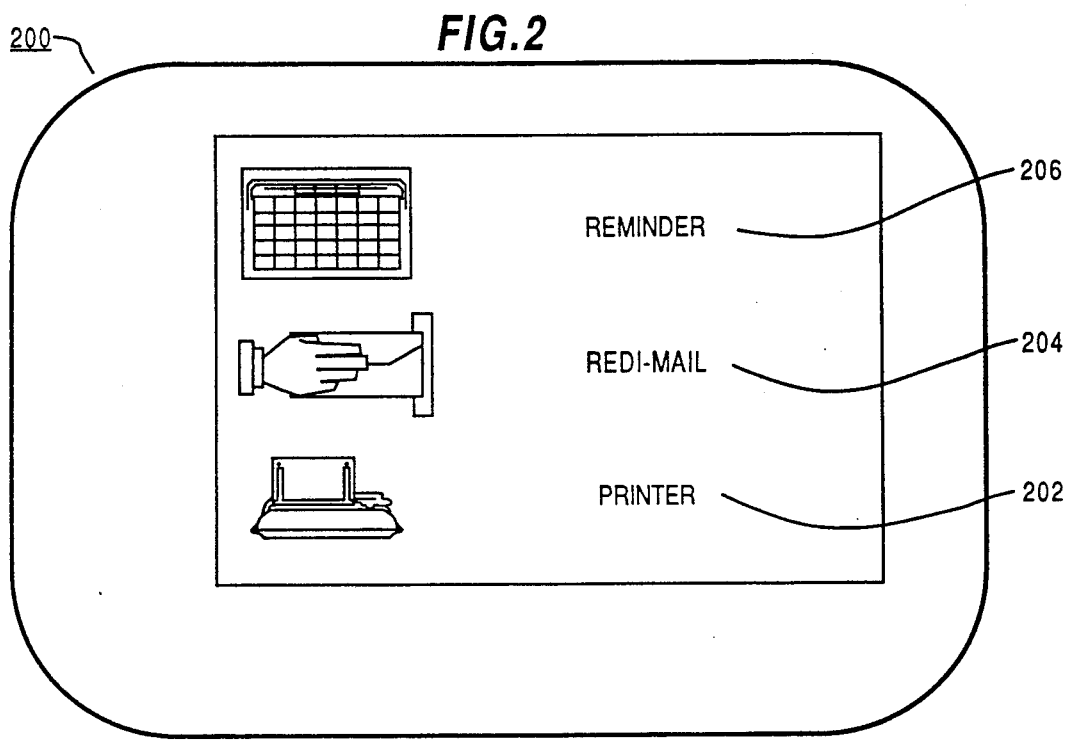
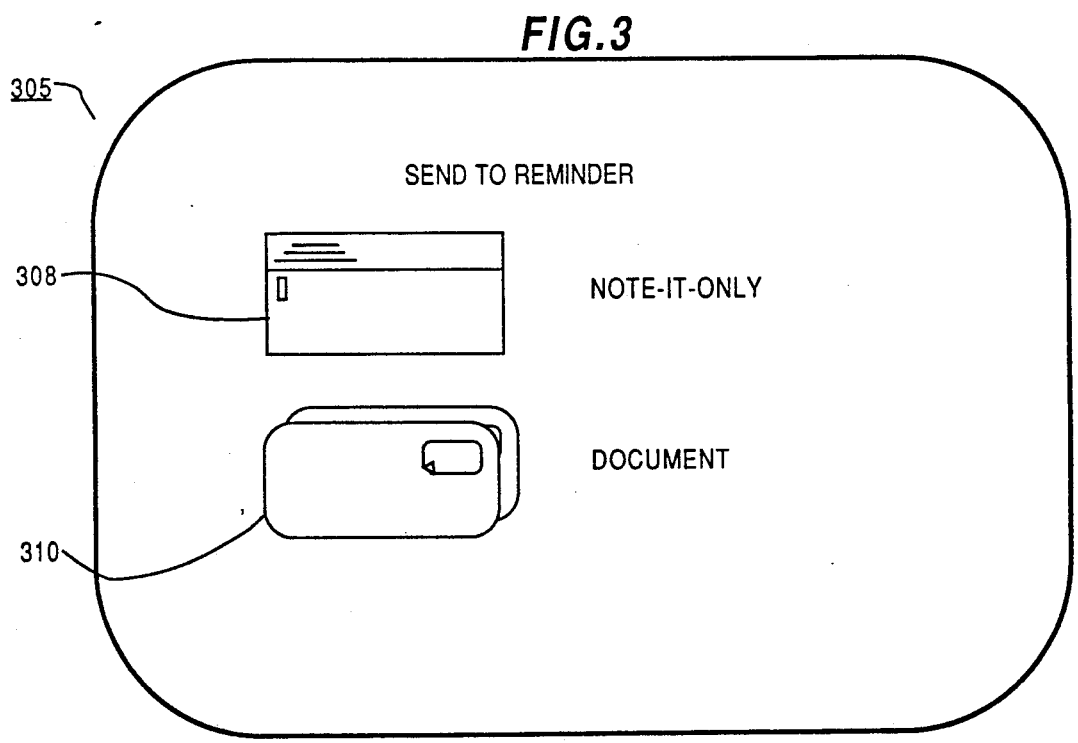

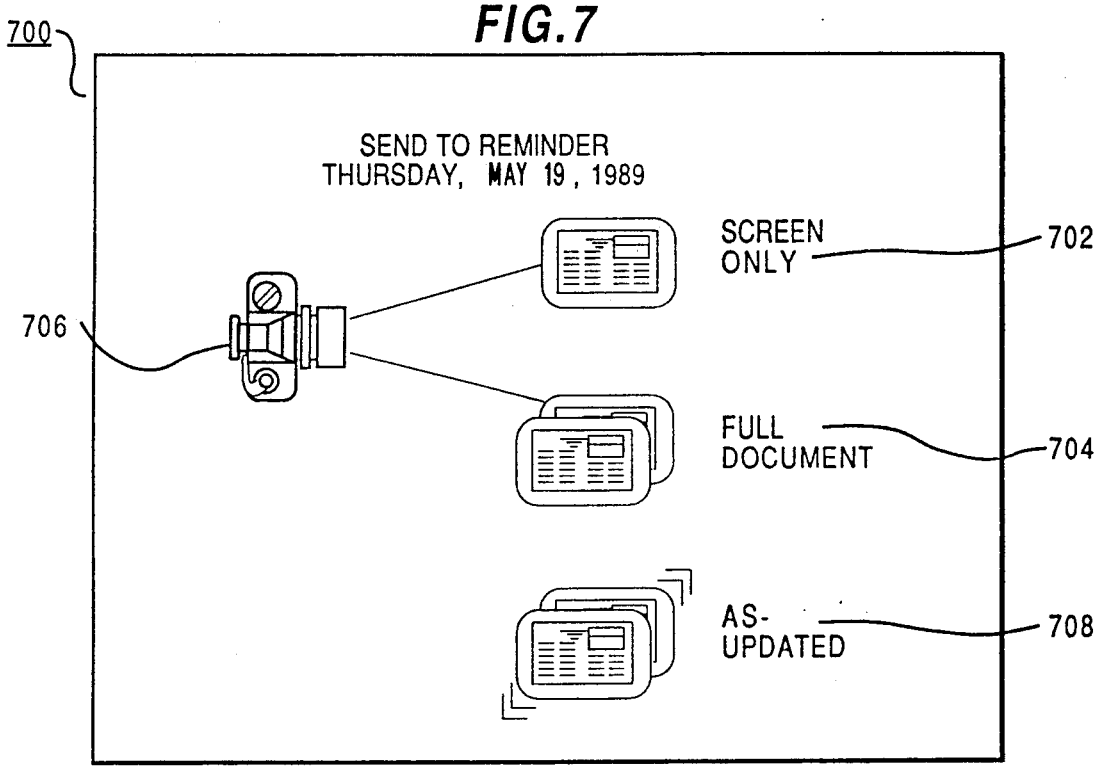
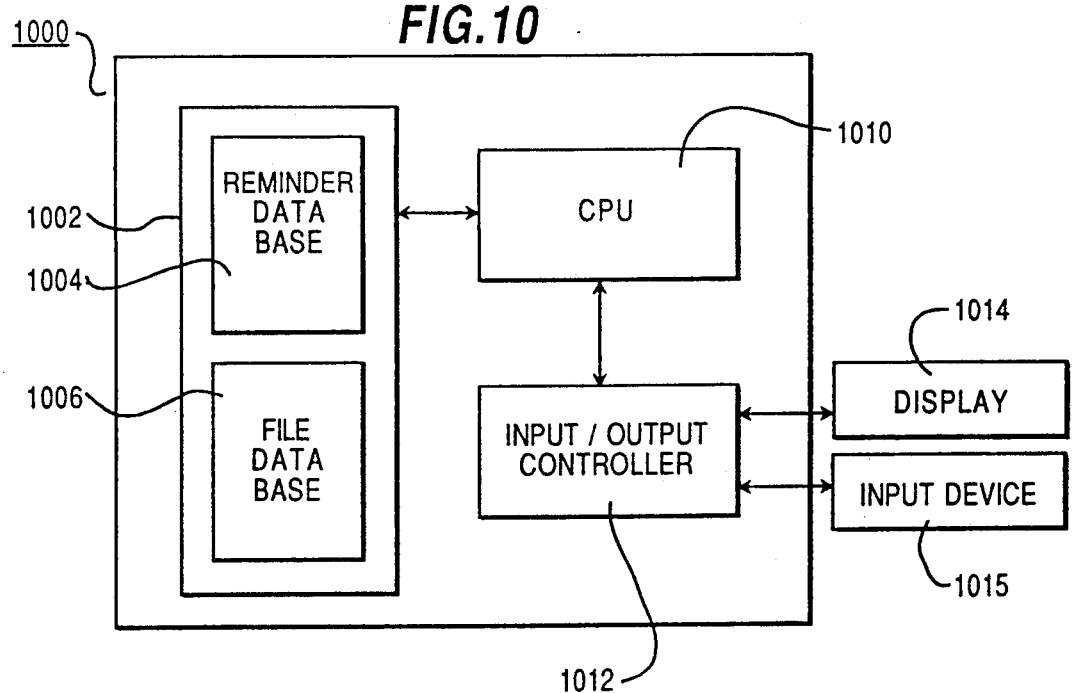

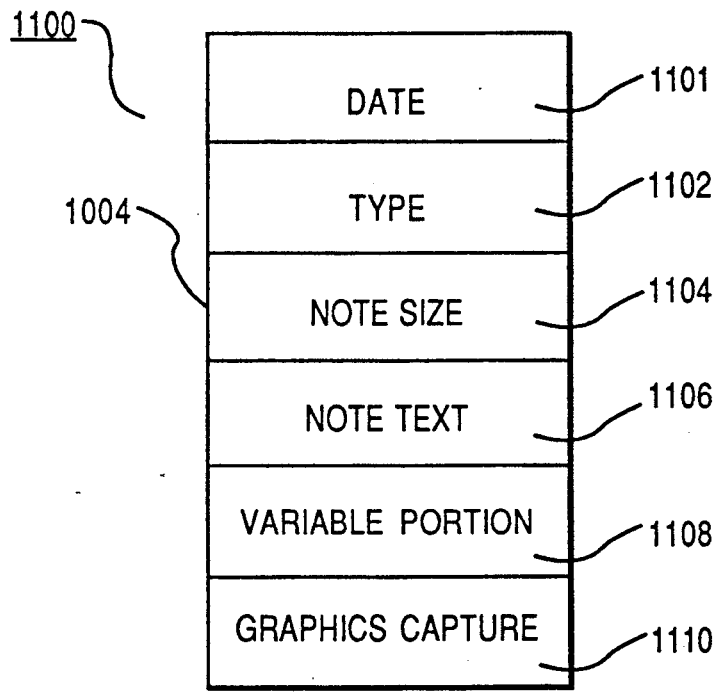
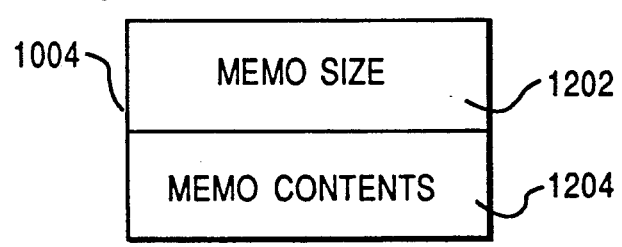

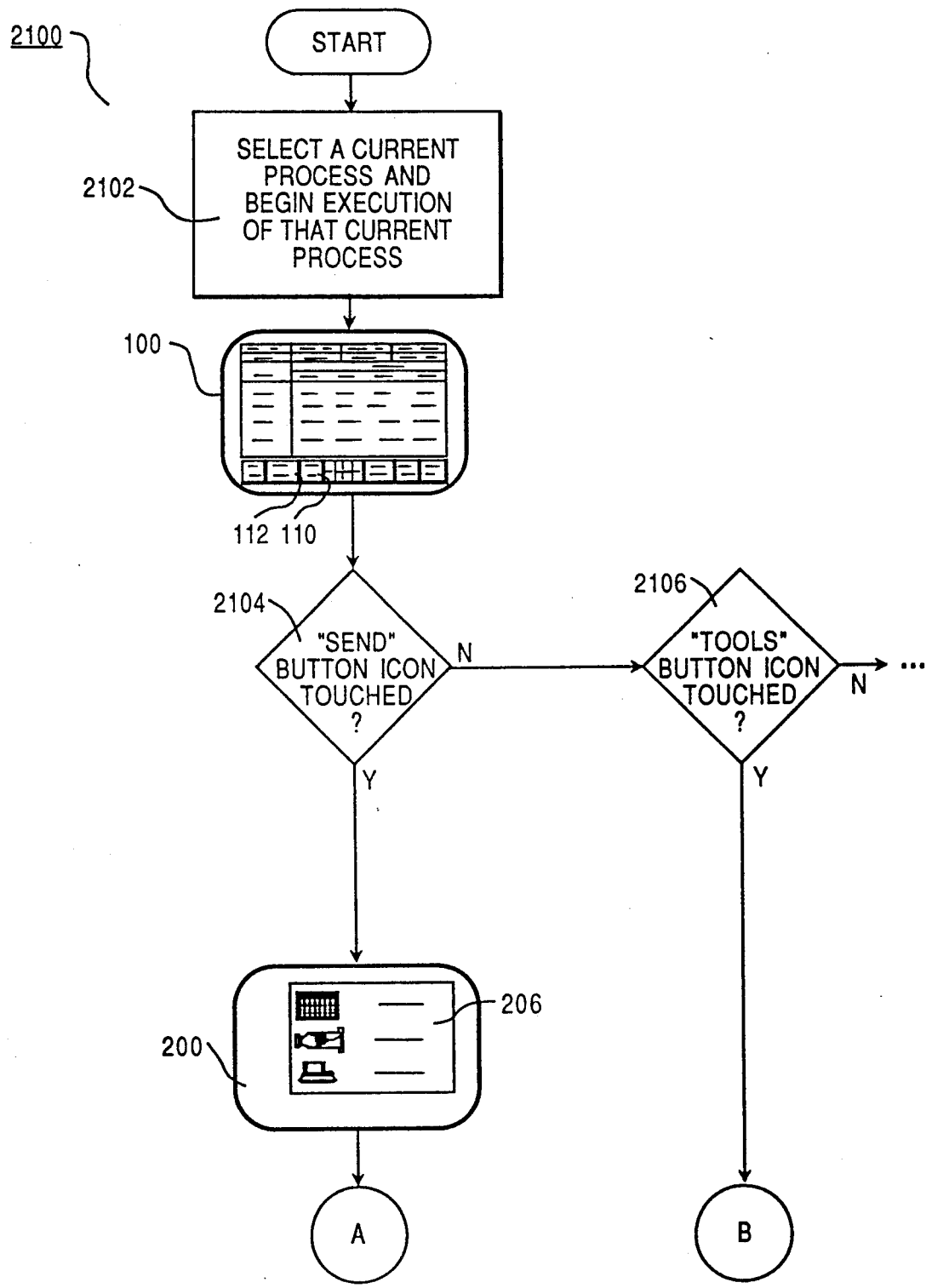

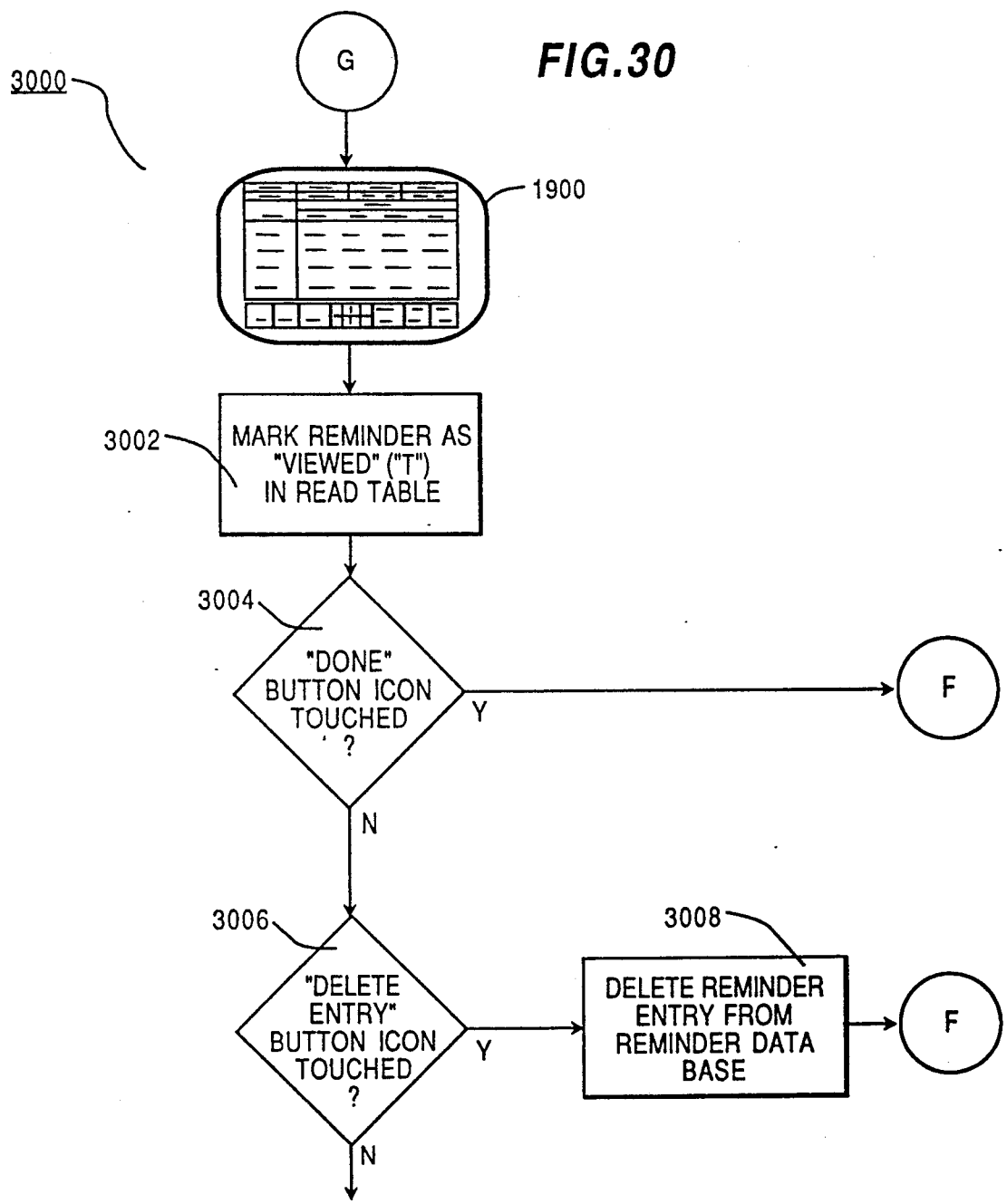

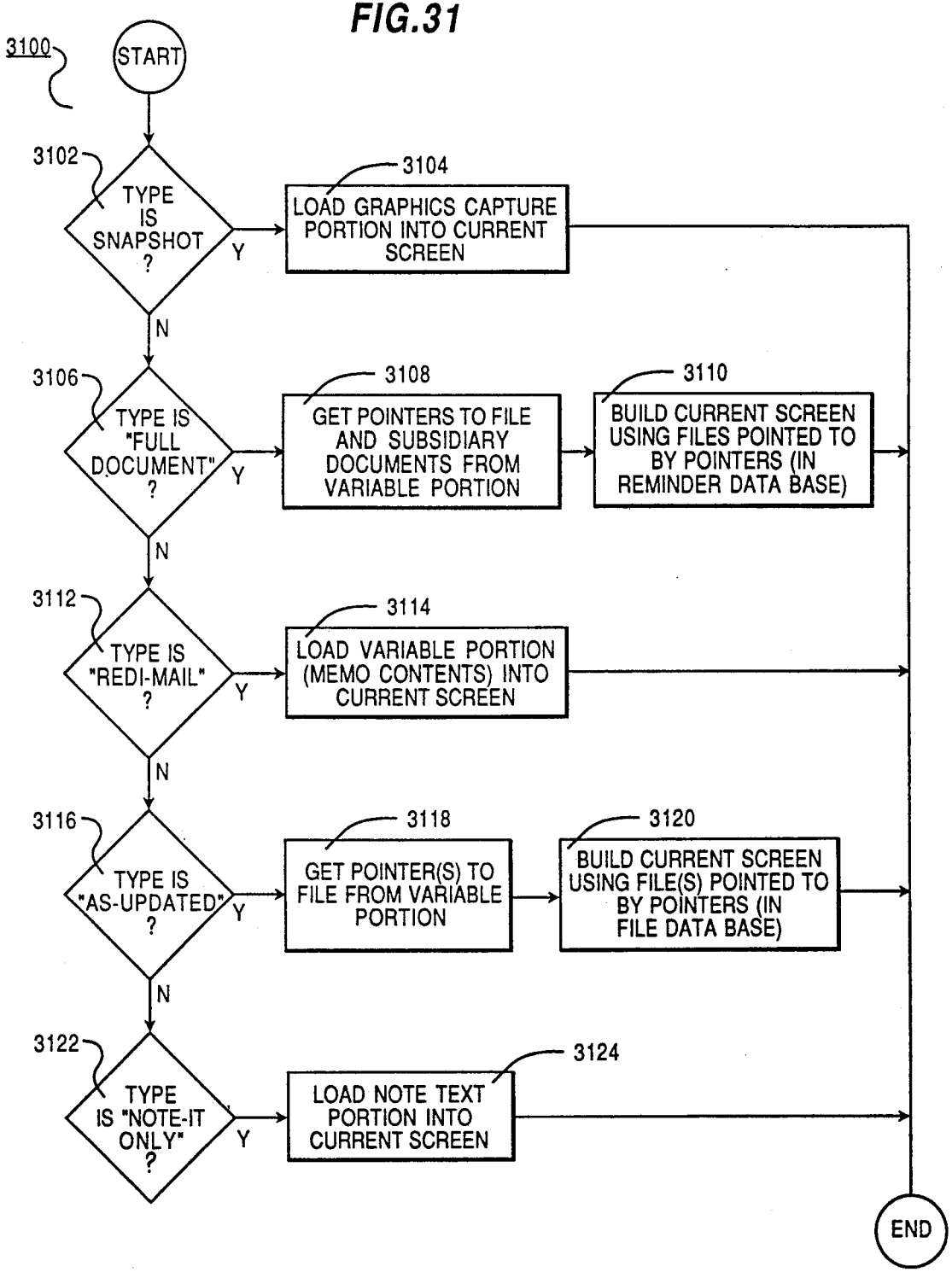

CREATING REMINDER MESSAGES/SCREENS, DURING EXECUTION AND WITHOUT ENDING CURRENT DISPLAY PROCESS, FOR AUTOMATICALLY SIGNALLING AND RECALLING AT A FUTURE TIME

BACKGROUND OF THE INVENTION

The present invention relates to the field of productivity software, and in particular, to a software package that allows a user to store a current screen display for recall at a later time, and that allows a user to add additional textual annotations to a current screen display and to store the annotated screen for recall at a later time.

Currently, people use computers for many types of applications. Business people, for example, often use computers to calculate spreadsheet data, to perform word-processing, and to view corporate data bases. As more daily work is transferred to computers, people spend more time each day using computer equipment.

Conventionally, a person has been required to posses computer skills in order to use computers. Little or no consideration is given to persons who are not computer trained.

In conventional systems, information is often presented to the user at a time when it is inconvenient to fully use its contents. For example, information often is received via an electronic mail system when a user is engaged in some other activity and can not devote all his time to a mail message. As a second example, a user may wish to review a report displayed on the computer screen during a staff meeting that is scheduled at a future time or the user may decide that the report should be reviewed again in a month once additional information has been incorporated into the report.

Conventional reminder software systems tend to be "stand-alone" packages that are not integrated into other types of computer applications. This is cumbersome. By way of example, if a computer user in the process of using a spreadsheet decides to store a reminder message using conventional reminder software, he usually must save his spreadsheet calculations, exit the spreadsheet software, invoke the reminder software, store his reminder, exit the reminder software, restart the spreadsheet software, re-access his spreadsheet calculations, and resume his spreadsheet activity. Often, the number of commands involved in such a seemingly simple act will dissuade the computer layperson from storing a reminder. Moreover, errors often are introduced when reminder information is retyped.

In addition, in current approaches to reminder software, the user must enter reminders using the keyboard himself, and must use computer commands that require training and frequent use to maintain familiarity. Persons who are not proficient typists or trained computer users are thus dissuaded from entering any but the most basic reminder messages, if they enter any at all.

SUMMARY OF THE INVENTION

It is an object of the present invention to store a reminder message without having to exit a process that is currently being executed.

It is a further object of the present invention to store a reminder message based on a current screen display without having to re-enter the portions of the reminder message that already exist on the computer.

It is a still further object of the present invention to store screen displays as part of a reminder message.

It is a still further object of the present invention to store a screen display as part of a reminder message, where the stored screen display reflects updates made after the screen display is stored as part of a reminder.

It is a still further object of the present invention to store a screen display as part of a reminder message, where the stored screen display does not reflect updates made after the screen display is stored as part of the reminder.

It is a still further object of the present invention to save an electronic reminder message newly created by a user using a touch sensitive screen.

It is a still further object of the present invention to allow a user who is averse to using a keyboard or a mouse to create reminder messages.

It is a still further object of the present invention to save an electronic reminder message composed of existing computer screens and user-created annotated messages that may be changed and updated.

It is a still further object of the present invention to save an electronic reminder item using no computer commands, but instead using color pictures indicating actions that may be taken.

It is a still further object of the invention to alert the user automatically to reminder items that should be reviewed on a given day, by using a picture on a screen.

It is a still further object of the present invention to allow viewing of present and future reminder items by using commands entered by a touch screen.

It is a still further object of the present invention to allow the user to view reminder items and to resave them for viewing at a future date.

It is a still further object of the present invention to allow the user to create message reminder screens and messages either from existing screens, or from input from a keyboard, a mouse, a touch screen, a track ball, or voice.

It is a still further object of the present invention to automatically carry over unseen reminder items to a next day.

It is a still further object of the present invention to differentiate for the user items that have been seen once, as compared to items not yet seen on a selected day.

Additional objects and advantages of the present invention will be set forth in part in the description which follows and in part will be obvious from that description or may be learned by practice of the invention. The advantages of this invention may be realized and obtained by the methods and apparatus particularly pointed out in the appended claims.

The present invention obtains the objects and advantages listed above by allowing a user to store a reminder message without exiting a currently executing process and by allowing the user to save various types of screen displays as part of a reminder message.

More specifically, to achieve the objects and in accordance with the purpose of the invention, as embodied and broadly described herein, the invention involves a method of creating a reminder notice file comprising the steps, performed by a data processing system, of: executing a current process in the data processing system, the current process including a display on a viewing screen; receiving an externally-generated reminder request to present the display at a specified time; and executing a reminder procedure, in response to the reminder request and without ending or exiting the current process, to store information in the reminder notice file that will allow the display to be recalled at the specified time.

BRIEF DESCRIPTION OF THE DRAWINGS

The accompanying drawings, which are incorporated in and which constitute a part of this specification, illustrate one embodiment of the, invention and, together with the description, explain principles of the invention.

FIG. 2 is a representation of a screen display including a "PRINTER" icon, a "REDI-MAIL" icon, and a "REMINDER" icon; FIG. 3 is a representation of a screen display including a "NOTE-IT-ONLY" icon and a "DOCUMENT" icon;

FIG. 7 is a representation of a screen display including a "SCREEN ONLY" icon, a "FULL DOCUMENT" icon, a Camera icon, and an "AS-UPDATED" icon;

FIG. 10 is a block diagram of a computer system used to implement a preferred embodiment of the present invention;

FIG. 11 is a diagram showing a format used in storing reminder messages;

FIG. 12 is a diagram showing a variable portion of FIG. 11 in more detail;

FIG. 21 is a flow chart showing a screen display of a current process and the steps required to initiate saving a reminder;

FIG. 30 is a continuation of the flow chart of FIG. 29 showing further steps of the reminder review process; and FIG. 31 is a flow chart showing a method of displaying a reminder to be viewed during the reminder review process.

DESCRIPTION OF THE PREFERRED EMBODIMENTS

Reference will now be made in detail to a presently preferred embodiment of the invention, examples of which are illustrated in the accompanying drawings.

For clarity of presentation, the following description of a preferred embodiment is divided into several portions. The first portion is an explanation of how to save reminders in accordance with a preferred embodiment and implementation of the invention. The second portion includes a description of how reminder alerts or messages are triggered. The third portion describes how the reminders are retrieved. The fourth portion explains how the reminders are periodically updated. The fifth portion describes the flow of control of the invention.

Saving Reminders

Overview

Figure 1:
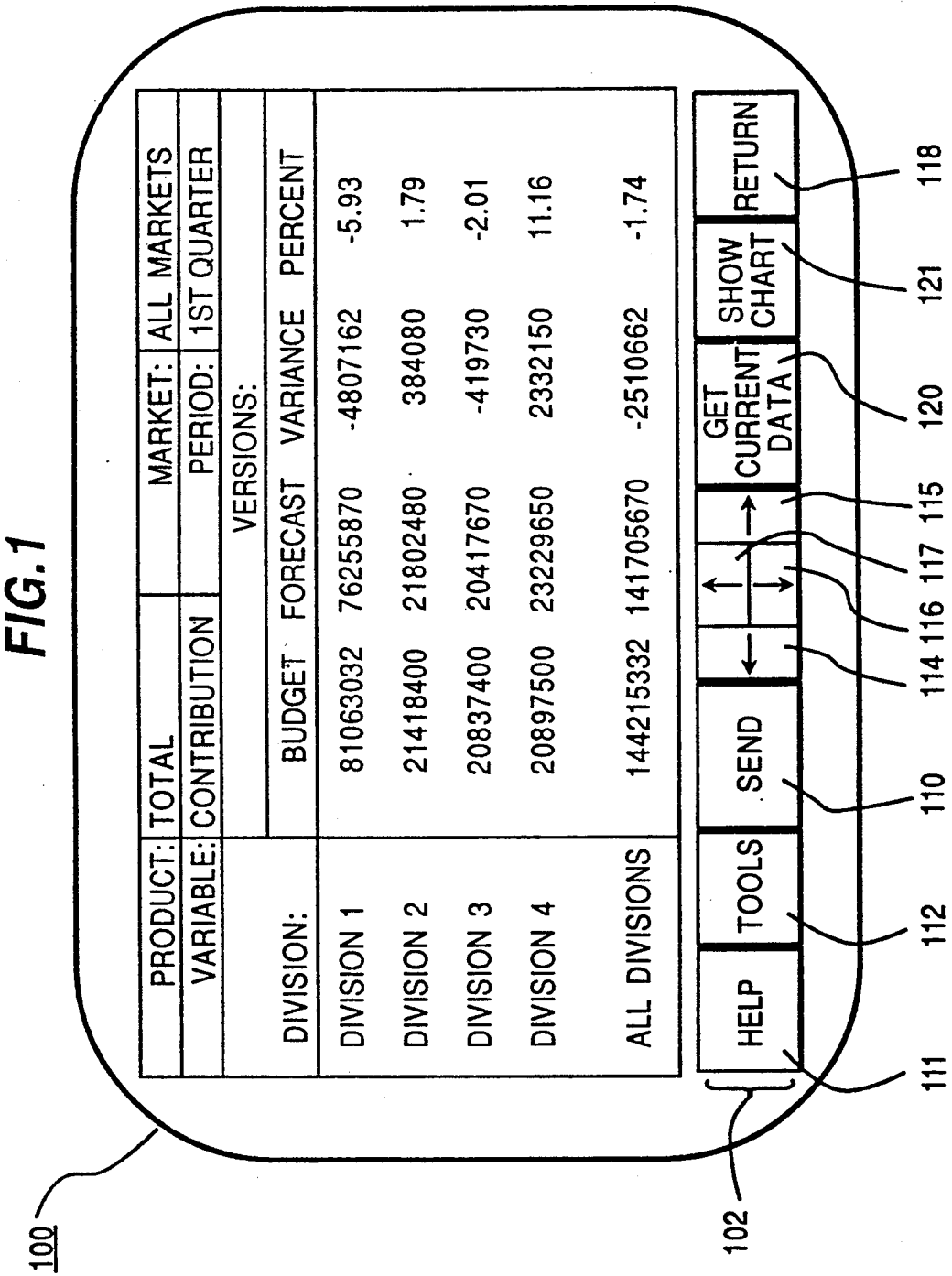
FIG. 1 is a representation of a screen display generated by a current software process, and including a "SEND" button icon and a "TOOLS" button icon.

As explained above, a user is often executing a current software process, such as a financial modeling or report displaying process, when he wants to save a reminder message. The preferred embodiment of this invention is a plurality of software modules in the COMMANDER EIS (EXECUTIVE INFORMATION SYSTEM) software package manufactured by Comshare, Inc. of Ann Arbor, Mich. FIG. 1 is a representation of a screen display 100 generated by a current software process. In a preferred embodiment, the current software process is also one of several applications of the COMMANDER EIS software. The current processes include EIS applications such as the Briefing Book, Execu-View, and Redi-Mail. The Briefing Book is a group of reports with predefined formats, the data of which is selected by the user for quick reference and which is updated periodically as appropriate, so that the reports are always displayed with current data. Execu-View is a multi-dimensional data base, including data such as company sales or inventory data. Redi-Mail is an electronic mail system. The Briefing Book, Execu- View, and Redi-Mail will not be described in detail herein, as the present invention may be used in conjunction with any one of a number of current processes, and is not limited to use with the applications briefly described above. Persons skilled in the art will understand that the present invention may be used in conjunction with any number of current processes, both within the COMMANDER EIS environment and in conjunction with other software. Such processes may be used in either a true multitask mode or in a mode in which the current process is automatically suspended by the system in order to save a reminder. In a preferred embodiment of the invention, when the reminder software is started, the present invention saves the name and current status of the current process in a manner so that execution of the current process can be resumed automatically when the Reminder process is complete.

Screen display 100 includes a row of button icons 102, including a "SEND" button icon 110, a "TOOLS" button icon 112, scrolling arrow icons 114, 115, 116, and 117, and a "RETURN" button icon 118. Each button icon of row of button icons 102 is selected by a user, either by controlling a mouse to position a cursor over one of button icons 102 and clicking a button on the mouse or by a touch screen display device, which allows a user to physically touch the desired button icon. "Touching" is a term used to include any manner of selecting an item displayed on the screen.

Touching scrolling arrow icons 114–117 causes the displayed screen to scroll left, right, down, and up, respectively. "TOOLS" button icon 112 and "RETURN" button icon 118 are described in detail below.

In a present preferred embodiment, the user requests that a reminder message be stored by touching "SEND" button icon 110. Once "SEND" button icon 110 is touched, a screen display 200, as shown in FIG. 2 is displayed.

Screen display 200 includes a "PRINTER" icon 202, a "REDI-MAIL" icon 204, and a "REMINDER" icon 206. Other variations of screen 200 exist, having different numbers of icons and having the icons arranged differently. "PRINTER" icon 202 and "REDI-MAIL" icon 204 initiate functions outside the scope of this invention, and will not be discussed here. Touching "REMINDER" icon 206 starts the process of storing screen 100 (or some other currently displayed screen display) as a reminder.

Once "REMINDER" icon 206 is touched, screen display 305, as shown in FIG. 3, preferably is displayed. Screen display 305 includes a "NOTE-IT-ONLY" icon 308 and a "DOCUMENT" icon 310. "NOTE-IT-ONLY" icon 308 resembles a paper reminder form and has a label reading "NOTE-IT-ONLY." "DOCUMENT" icon 310 resembles a computer screen display and has a label reading "DOCUMENT."

In a preferred embodiment of the invention, screen display 305 is not displayed under all circumstances. For example, if only a restricted type of reminders is allowed, the software will make the choice between "DOCUMENT" and "NOTE-IT" without consulting the user.

Figure 4:
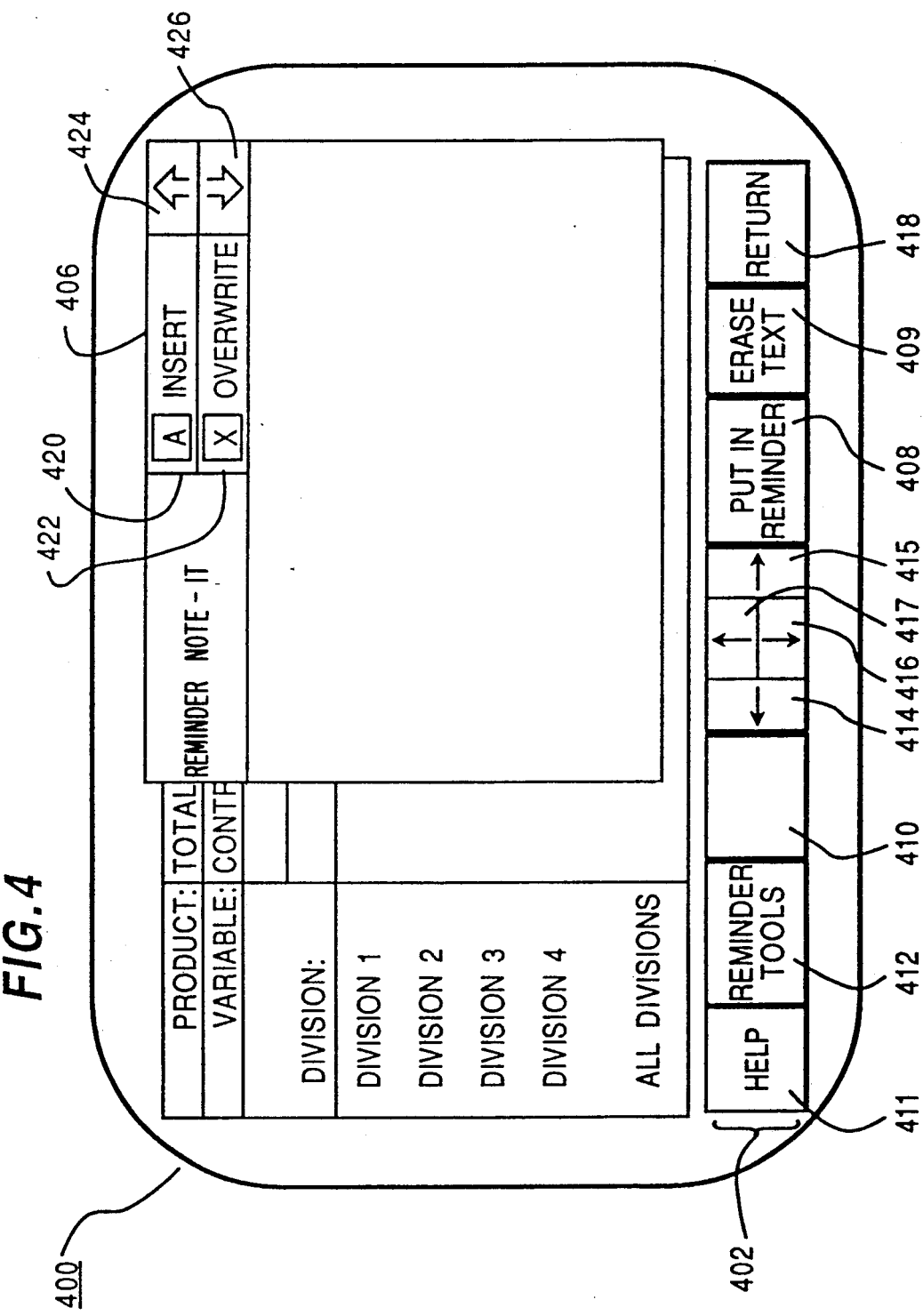
FIG. 4 is a representation of the screen display in FIG. 1 with a small Note-It area and a "PUT IN REMINDER" button icon.

When "DOCUMENT" icon 310 is touched, screen display 305 is replaced by screen display 400 shown in FIG. 4. Screen display 400 is similar to the screen display of FIG. 1, with a small Note-It area 406 located in the upper-right-hand corner. Button icons 402 are similar to button icons 102 of FIG. 1, but include a "PUT IN REMINDER" button icon 408, an "ERASE TEXT" button icon 409, and a "REMINDER TOOLS" button icon 412. Screen display 400 also includes scrolling arrow icons 414–417.

Touching "REMINDER TOOLS" button icon 412 causes display of a tools screen display (not shown). This tools screen display includes a menu including the words "EXPRESS RETURN," "AUDIT REMINDER," and "LOCK." Touching "EXPRESS RETURN" causes an exit from the Reminder application, and a return to a highest level of the current application. Touching "AUDIT" allows a user to review currently existing reminder messages. Touching "LOCK" causes an action similar to the action of "EXPRESS RETURN," except that the keyboard or other input device of the computer is "locked" until a password is entered. The "LOCK" function is desirable from a security standpoint.

Note-It area 406 allows the user to add notes or comments to the currently displayed screen before the screen is saved as a reminder. Creation of a Note-It is optional, and, if the user wishes, he can save the currently displayed screen as a reminder without adding additional comments. To create a Note-It associated with a currently displayed screen, the user begins typing the text of the Note-It. The text is echoed in Note-It area 406. To save a display screen and an associated Note-It, the user touches "PUT IN REMINDER" button icon 408 and the screen display, along with the Note-It, is saved as a reminder, as described further below.

Note-It area 406 includes button icons that allow basic editing functions such as character insert, delete, etc. For example, "ERASE TEXT" button icon 409 cause any text previously entered in Note-It area 406 to be erased. Touching "INSERT" area 420 and "OVERWRITE" area 422 causes new text to be entered in insert mode or overwrite mode, respectively. In insert mode, new text does not destroy text already existing in Note-It area 406. In overwrite mode, new text destroys text existing at a current cursor position in Note-It area 406. Initially, the Reminder software defaults to insert mode. Thus, "INSERT" area 420 is displayed in gold and "OVERWRITE" area 422 is displayed in grey. Scrolling arrow icons 424 and 426 are used to scroll Note-It area 406. If "OVERWRITE" area 422 is touched, the mode changes and the display colors of areas 420 and 422 are reversed. It will be understood that various keys on a keyboard or input device control simple editing functions in Note-It area 406, such as cursor movement. These simple editing functions are well-known to those of ordinary skill in the art and will not be described further.

Figure 9:
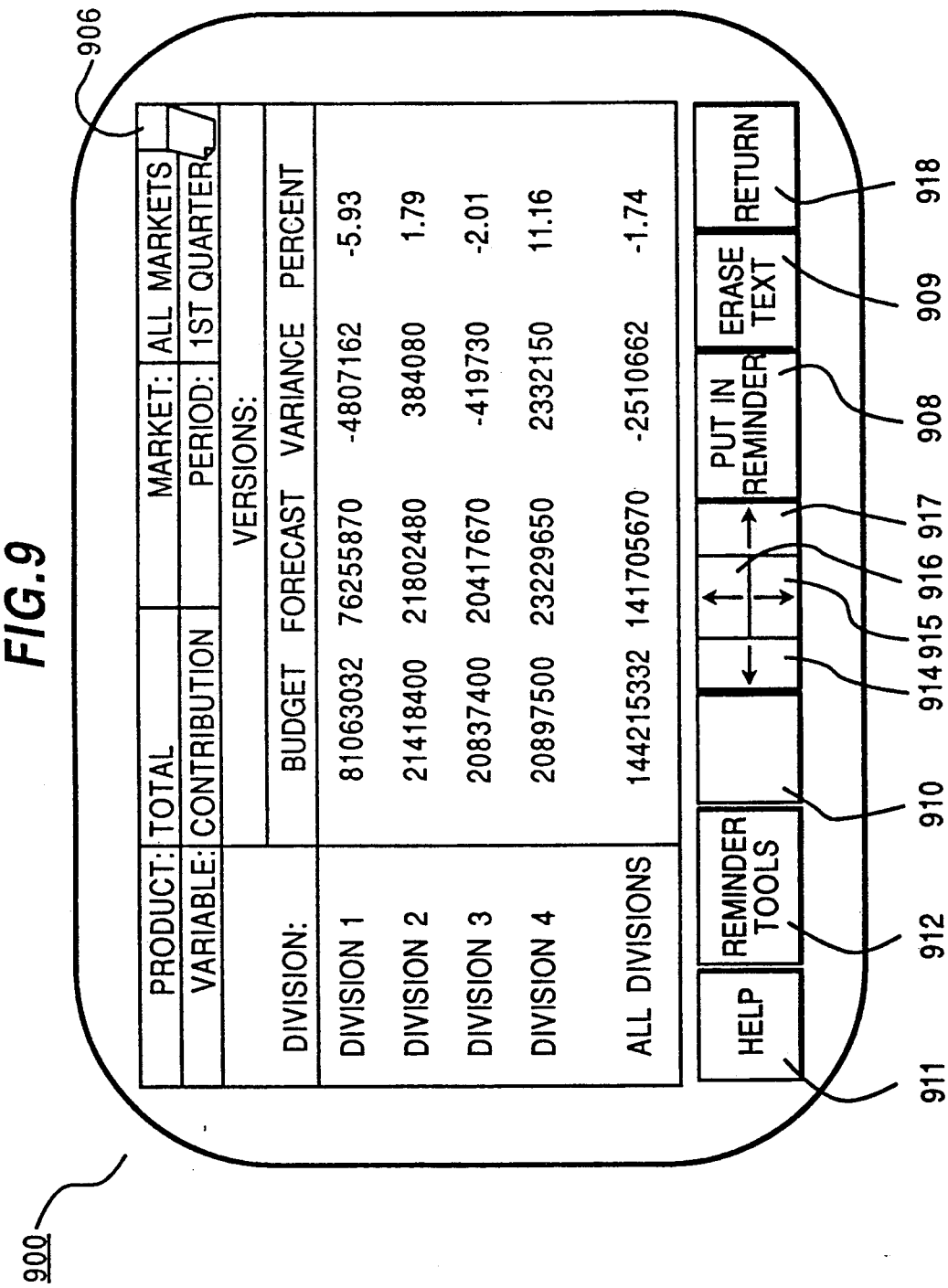
FIG. 9 is a representation of a screen display including a Note-It icon.

If the user wishes to see the screen underneath Note-It area 406, the user touches the screen anywhere other than Note-It area 406. This action will cause Note-It area 406 to shrink to the size of a Note-It icon 906 as shown on display 900 of FIG. 9. Touching Note-It icon 906 again restores Note-It area 406 to its original size.

In a preferred embodiment, Note-It area 406 acts as though it was "stuck to the glass" of the screen display. Thus, the document under Note-It area 406 can be moved by scroll arrow icons 414–417 without moving the Note-It area. In another preferred embodiment, scrolling is disabled for the document underlying Note-It area 406.

Figure 5:
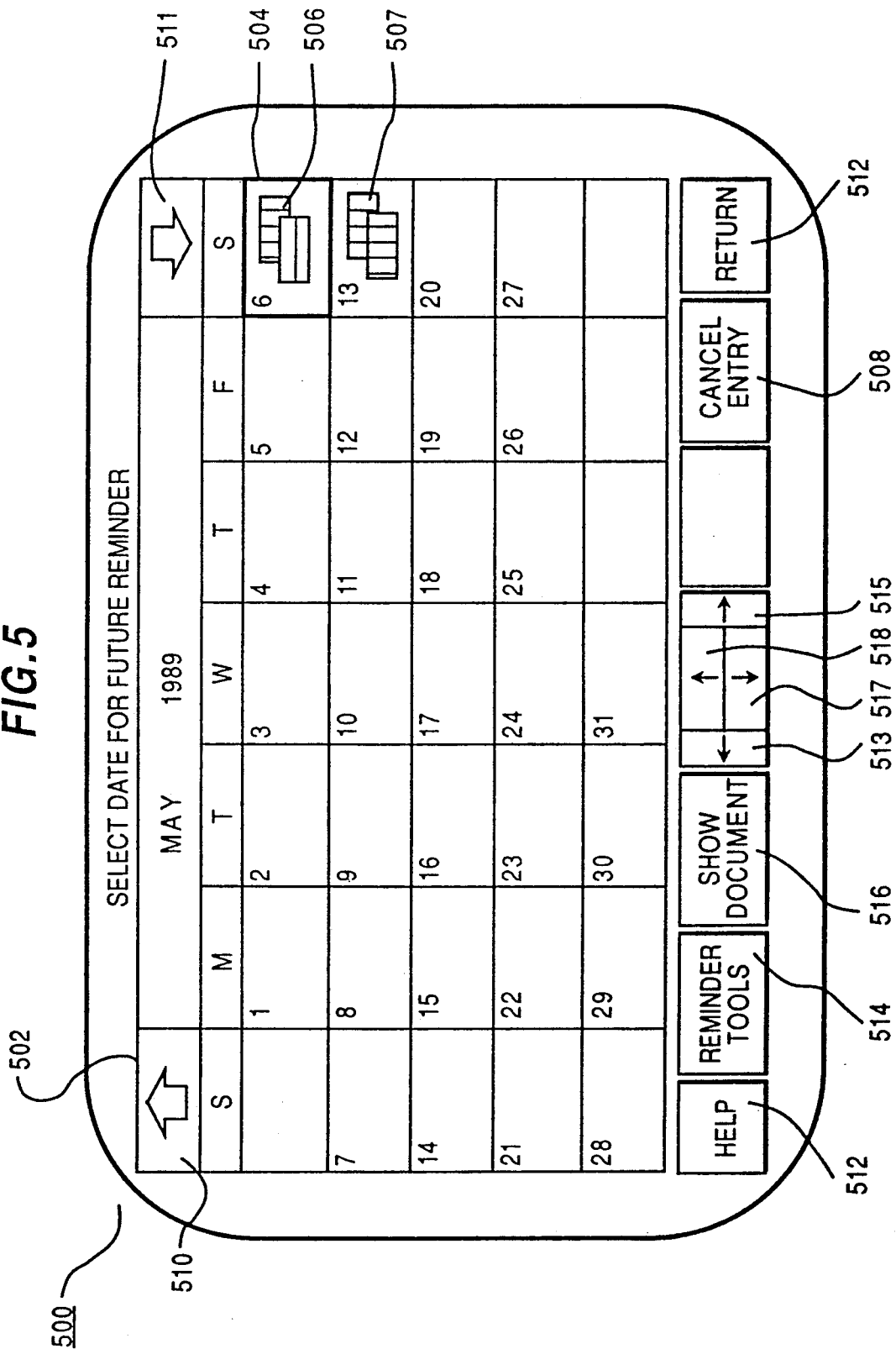
FIG. 5 is a representation of a screen display including a reminder calendar and various reminder button icons.

When "PUT IN REMINDER" button icon 408 is touched, a screen display 500, as shown in FIG. 5, is displayed. Screen display 500 includes a calendar 502 showing a current month. (Calendar 502 of FIG. 5 shows May 1989.)

Calendar 502 allows a user to select dates for reminders just by touching the displayed date boxes. Selectable dates, i.e., dates subsequent to and including the current date, are preferably indicated by displaying the corresponding date boxes in a color different from that of date boxes of non-selectable dates. In FIG. 5, a date box 504 represents a most recent date for which a reminder was stored. Date box 504 is displayed with a heavy yellow border. Date box 504 and all other date boxes following it have a grey background. The day number of the current date is displayed in yellow.

In a preferred embodiment, the touchable boxes of calendar 502 are normally displayed using white letters on a grey background. To save a reminder, the user touches a date box and the reminder is saved for that date. In addition, touching date box 504, for example, more than once saves additional copies of the reminder for each additional time the date box is touched. The user also may touch more than one box if a reminder is desired for more than one date. A reminder is created for the date corresponding to each date box touched.

Once a box is touched, a double page symbol 506, such as that shown in box 504 is displayed. Double page symbol 506 preferably includes a foreground rectangle and a background rectangle. In a preferred embodiment, the foreground rectangle is yellow and the background rectangle is red.

A similar reminder symbol 507 is displayed in calendar date boxes representing dates for which reminders have been previously saved. In a preferred embodiment, the foreground and background rectangles of reminder symbol 507 are both red.

Screen display 500 also preferably includes a "CANCEL ENTRY" button icon 508. When "CANCEL ENTRY" button icon 508 is touched, the reminder associated with the calendar date box most recently touched is deleted. In a preferred embodiment, if no calendar date boxes have been touched, "CANCEL ENTRY" button icon 508 is displayed with a black background. In these circumstances, touching "CANCEL ENTRY" button icon 508 has no effect. Reminders which have previously been saved (indicated by reminder symbol 507) cannot be deleted by "CANCEL ENTRY" button icon 508.

Screen display 500 also preferably includes a first scroll arrow icon 511 and a second scroll arrow icon 510. Touching first scroll arrow icon 511 causes a calendar representing a later month than the currently displayed calendar 502 to be displayed. Touching second scroll arrow 510 causes a calendar representing an earlier month than the month of the currently displayed calendar 502 to be displayed. Preferably, no month previous to the current month can be displayed. Similarly, in a preferred embodiment, there is no upper limit to the months that can be displayed, as the invention calculates the appearance of calendar 502 for a month and year to be displayed in a manner well-known to persons of ordinary skill in the art. Screen display 500 also includes four scroll arrow icons 513, 515, 517, and 518. In a current embodiment, these scroll arrow icons are disabled, and touching them has no effect.

Figure 6:
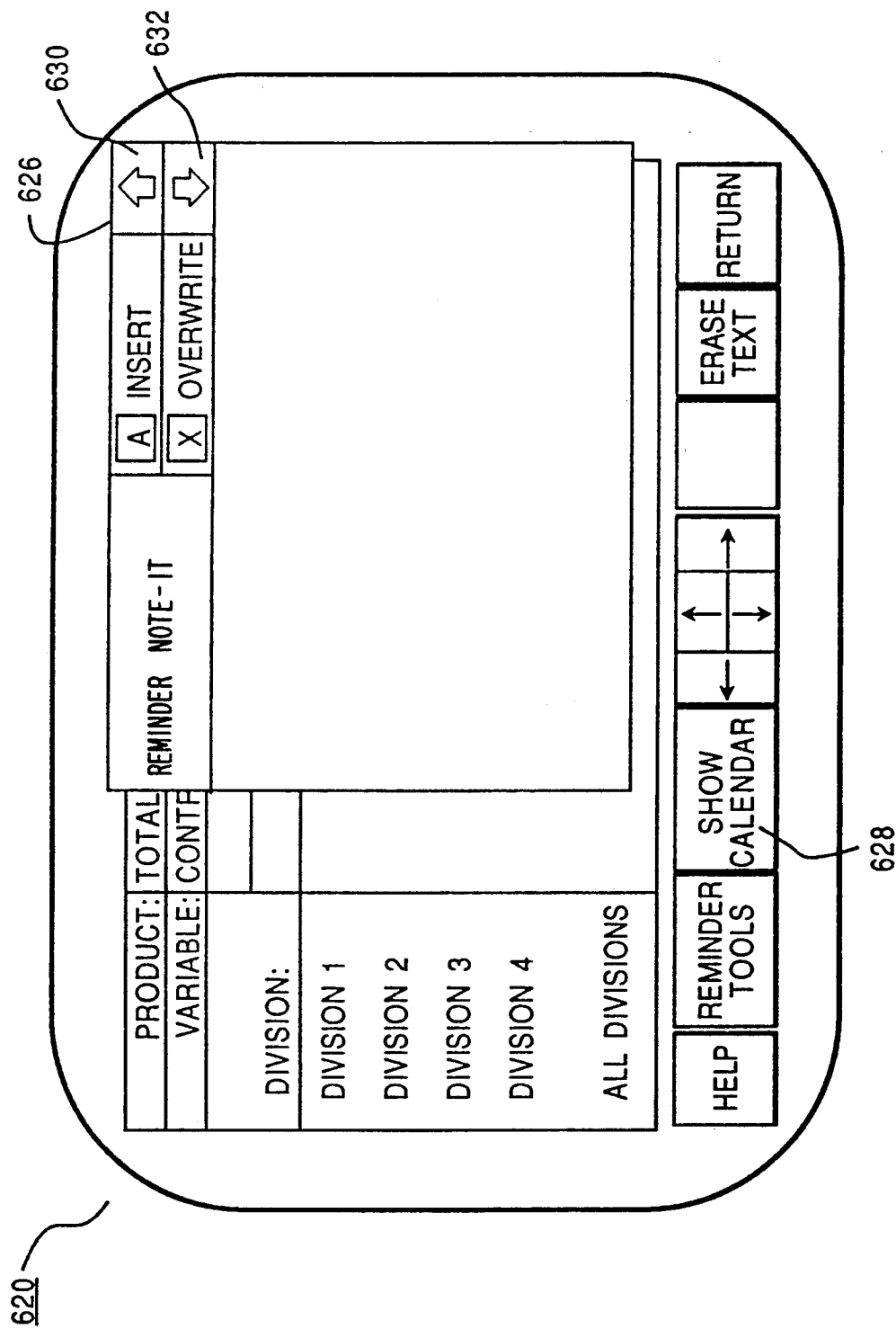
FIG. 6 is a representation of a screen display including a small Note-It area and a "SHOW CALENDAR" button icon.

The text of a Note-it may be altered between selecting dates. Touching a "SHOW DOCUMENT" button icon 516 redisplays screen display 620 of FIG. 6, which is identical to screen display 400 of FIG. 4, except that it includes a "SHOW CALENDAR" button icon 628 and "PUT IN REMINDER" button icon 408 is not visible. Touching "SHOW CALENDAR" button icon 628 redisplays screen display 500.

Once the user has selected the date or dates in which he wishes to store the reminder, he touches a "RETURN" button icon 512. Touching "RETURN" button icon 512 causes the reminder or reminders (a current screen with an attached Note-It, or a Note-It not associated with a current screen) to be saved as described below in more detail. Control then returns to the process currently executing before the user saved the reminder.

Now that the method of selecting a date and storing a reminder is understood generally, the various types of reminders can be described. In a preferred implementation of COMMANDER EIS, three types of current processes exist, each capable of displaying one of three types of screen displays: Redi-Mail memo screens, Execu-View report screens, and Briefing Book Report screens. The invention may be used with other processes not specifically described herein.

The Redi-Mail process displays a Redi-Mail memo screen, which includes source and destination information as well as a mail memo. For example, a Redi-Mail memo may inform a user of a meeting time and location and include a report relating to the meeting. The Execu-View process displays an Execu-View report, which is a view into a multi-dimensional data base. For example, an Execu-View report may display sales figures for certain salesmen and sales territories. FIG. 1 is an example of an Execu-View report. The Briefing Book process shows a most recent version of an updatable Briefing Book report. For example, a Briefing Book report may display a sales report for a user-determined month.

The Briefing Book report can be single or multi-page document. As described below, either a current screen display only or an entire report containing the current screen display can be saved for the Briefing Book report.

A user may, at different times, want to see each one of the screens displayed by the various COMMANDER EIS processes at some specific date. This can be done using reminders as implemented in this invention.

A preferred embodiment of the present invention stores five different types of reminders: a Redi-Mail memo, a snapshot of a current screen Execu-View or Briefing Book screen display a snapshot of, a multi-page Briefing Book screen display, an "as-updated" Briefing Book screen display, and a reminder "Note-It" message that was not generated by a current process. Each of these types of reminders is described below.

If a Redi-Mail memo is currently displayed on the screen by the Redi-Mail process, the Redi-Mail memo can be saved as a reminder message for the days touched by the user on calendar 502. Preferably, all pages of a Redi-Mail memo are saved. Thus, a snapshot of the full Redi-Mail document is saved.

If an Execu-View report is currently displayed on the screen by an Exec-View process, a "snapshot" of the current screen can be saved as a reminder message for the days touched by the user on calendar 502. A "snapshot" is a view of the screen "frozen" at a particular time. Thus, a snapshot of the screen includes a picture of the current screen as it is currently being displayed.

If a Briefing Book report is currently displayed on the screen by a Briefing Book process, a screen display 700, as shown in FIG. 7 is displayed. Screen display 700 includes, in addition to a "SEND TO REMINDER"

label and the date selected to store the reminder, a "SCREEN ONLY" icon 702, a "FULL DOCUMENT" icon 704, a Camera icon 706, and an "AS-UPDATED" icon 708. Touching each of the icons 702, 704, and 708 causes a Briefing Book report to be saved as a part of a reminder message.

Touching Camera icon 706 has no effect. Camera icon 706 is for informational purposes only and is displayed only to indicate that "SCREEN ONLY" icon 702 and "FULL DOCUMENT" icon 704 represent similar snapshot functions.

Touching "SCREEN ONLY" icon 702 causes a "snapshot" of only what appears if the screen display to be saved as a reminder. Thus, a Briefing Book snapshot is similar to the Execu-View report snapshot described above.

Touching "FULL DOCUMENT" icon 704 causes a "snapshot" of all pages of a multi-page Briefing Book report to be saved as a reminder. In this manner, "FULL DOCUMENT" icon 704 differs from "SCREEN ONLY" icon 702. However, "FULL DOCUMENT" icon 704 has an effect similar to "SCREEN ONLY" icon 702, in that both cause a static copy of the screen to be saved. Thus, when a reminder saved as a full document is recalled, all pages of the original report can be accessed using arrow icons similar to arrow icons 114, 115, 116, and 117 of FIG. 1.

Touching "AS-UPDATED" icon 708 causes a screen display to be saved in updatable form. Thus, for example, as the reports are updated in the Briefing Book by the normal Briefing Book update process, the reminders saved via "AS-UPDATED" icon 708 are also updated. In a current embodiment, only Briefing Book reports may be saved in updatable form. Therefore, instead of being current as of the entry of the reminder, such as with a snapshot, reminders created via "AS-UPDATED" icon 708 always reflect the most recently available data in the Briefing Book reports.

Functions described with regard to FIGS. 4-7 allow storage of a document or a document portion which is a part of a process currently being executed. There are occasions, however, where a more traditional reminder message is required which has nothing to do with the current process. Such reminders are stored using "NOTE-IT-ONLY" icon 308 of FIG. 3. When "NOTE-IT-ONLY" icon 308 is touched, screen 305 is replaced by a screen display 800 shown in FIG. 8. Screen display 800 includes a Note-It area 806, similar to Note-It area 406 of FIG. 4, but larger in size, a "PUT IN REMINDER" button icon 808, an "ERASE TEXT" button icon 809, an "INSERT" area 820 a current date area 821 displaying today's date, and an "OVERWRITE" area 822. "PUT IN REMINDER" button icon 808, "ERASE TEXT" button icon 809, and areas 820 and 822 are operate similarly to corresponding icons of FIG. 4.

To create a Note-It that is not presently associated with a currently displayed screen, the user begins typing a message. The message is echoed in Note-it area 806. When the message has been entered, the reminder entry is saved by touching a "PUT IN REMINDER" button icon 808. Screen 500, as shown in FIG. 5, is displayed and the user selects one or more date boxes as described above. Again, the text of the Note-It may be changed between selection dates. Again, "RETURN" button icon 510 saves the reminder or reminders (a current screen with an attached Note-It or a Note-It not associated with a current screen) and returns control to the current process.

Storage Formats of the Reminder Data Base

FIG. 10 is a block diagram 1000 of a computer system on which a preferred embodiment of the present invention is implemented. Block diagram 1000 includes a memory 1002, a CPU 1010, an input/output controller 1012, a screen display 1014, and an input device 1015. CPU 1010 stores data to and retrieves data from memory 1002. CPU 1010 also controls input and output to and from screen display 1014 and input device 1015 through input/output controller 1012.

Memory 1002 stores the computer program with which the present invention is preferably implemented. Memory 1002 also includes a reminder data base 1004 and a file data base 1006. Memory 1002 also stores information identifying the current process that was executing when the Reminder software was started, and stores information identifying the screen display last displayed by that process and information identifying all files needed to create that current screen.

Reminder data base 1004 stores the saved reminder messages as discussed below, copies of files from file data base 1006, and a read table 1550 of FIG. 15, as also discussed below. File data base 1006 stores various system files and files created by the user using various applications, such as word processing programs and data base programs. Memory 1002 may alternately include a data storage device such as a magnetic disk, a floppy disk, etc.

In a preferred embodiment, each reminder is stored in a separate reminder entry in reminder data base 1004. Five different types of reminder entries are stored in reminder data base 1004: Redi-Mail memos, snapshots of a single screen, snapshots of multi-page documents (also called "full documents"), as-updated documents (which may include multi-page documents), and Note-It reminder memos.

FIG. 11 shows a format of a single reminder entry 1100 in reminder data base 1004 in accordance with a preferred embodiment of the invention. Reminder entry 1100 preferably is a variable text-based structure that may contain subsidiary structures as described below. Reminder entry 1100 preferably includes a date portion 1101, a type portion 1102, a note size portion 1104, a note text portion 1106, a variable portion 1108, and a graphics output capture portion 1110.

Date portion 1101 preferably includes an ASCII date, stored in YYMMDD format, indicating the date that the user wishes to be alerted to the reminder. This date was selected by way of screen 500. If a user wishes to be alerted to a reminder on more than one date, multiple reminder entries 1100 are saved, one for each date. These multiple reminders differ only in their date fields, unless the user changed the text in Note-It area 406 or 806 as described in connection with FIG. 6. In this case, note size portion 1104 and note text portion 1106 may also differ.

Type portion 1102 preferably includes an ASCII number indicating one of the five types of reminder entries described above. Note size portion 1104 preferably includes an ASCII number indicating the length in bytes of a Note-It attached to the reminder by the user, as described above in connection with FIG. 4. Note text portion 1106 preferably includes the ASCII text of any attached Note-it. Note-Its not associated with a screen display (FIG. 8) are also stored in note size portion 1104 and note text portion 1106.

Graphics output capture portion 1110 is used to store screen only snapshots, and includes data describing the screen displayed by the process being executed when the reminder was saved. The exact content of graphics output contents capture portion 1110 is not critical to the present invention, and any of a number of well-known graphics storing formats can be used to store the screen generated when the reminder was saved.

Variable portion 1108 is of zero length for screen only snapshots and for Note-It reminders not associated with a screen display. In a reminder entry for a Redi-Mail memo, variable portion 1108 includes portions 1200 shown in FIG. 12. Portions 1200 include a memo size portion 1202 and a memo contents portion 1204. Memo size portion 1202 includes an ASCII number indicating the length of the memo in bytes. Memo contents portion 1204 includes the text of the Redi-Mail memo, including the source and destination indicators. The exact format of a Redi-Mail message file is not important to the present invention, and any number of message file formats could be used.

Figure 13:
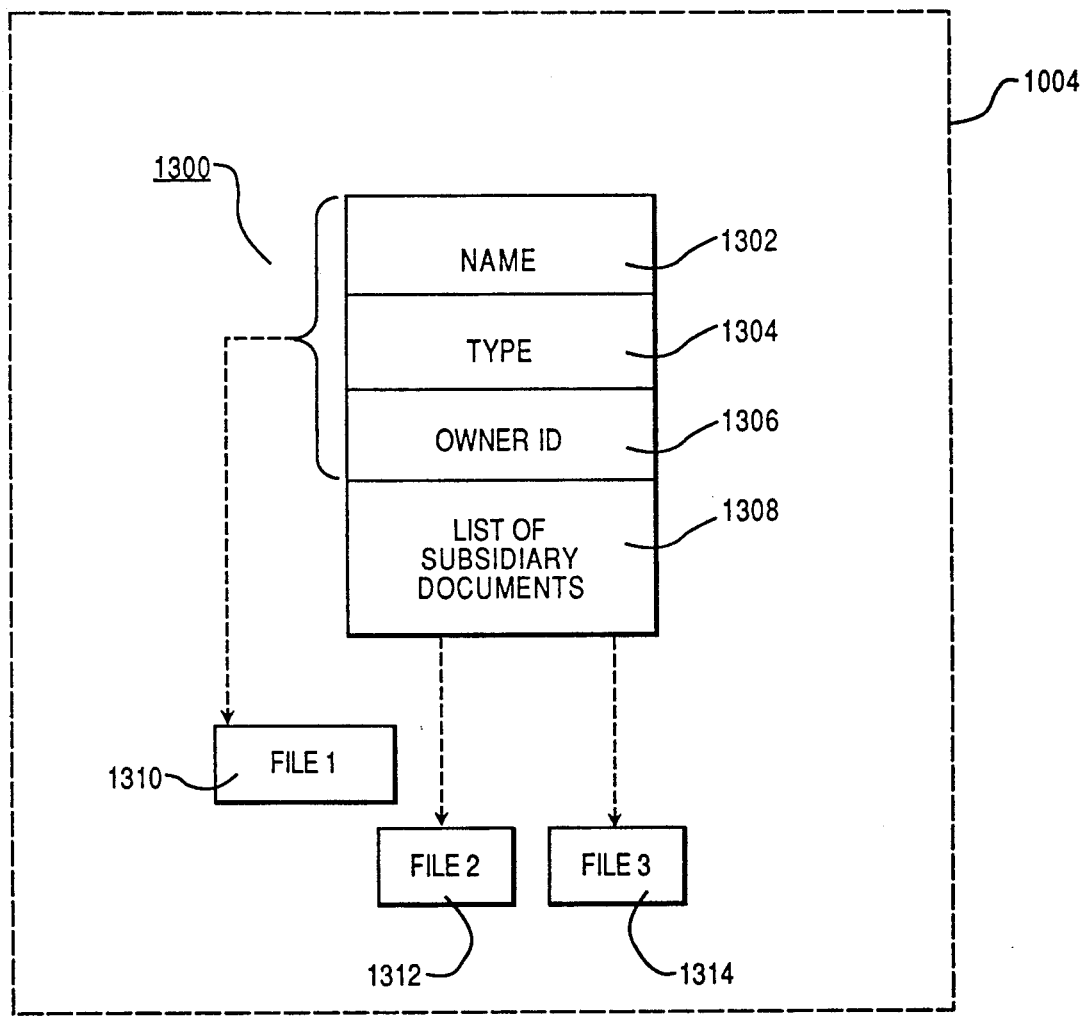
FIG. 13 is a diagram showing a variable portion of the format of FIG. 11 in more detail and a first data base of FIG. 10.

In a reminder entry for a snapshot of a multi-page document, variable portion 1108 includes portions 1300 shown in FIG. 13. Portions 1300 include a name portion 1302, a type portion 1304, an owner ID portion 1306, and a list of subsidiary documents 1308. (Note that type portion 1304 is not the same as type portion 1102). Each of these portions 1300 reference one or more files in reminder data base 1004 (see FIG. 10).

In a preferred embodiment, files are identified by a name, a type, and an owner ID. Thus, in portions 1300, name portion 1302, type portion 1304, and owner ID portion 1306 together identify the multi-page file saved by the user, e.g. file1 1310 shown in FIG. 13. In a preferred embodiment, multi-page documents may actually be composed of several files displayed contiguously. Thus, the list of subsidiary documents 1308 includes a series of name, type, and owner ID portions, one for each file that forms the multi-page document. Such files are shown in FIG. 13 as file2 1312, and file3 1314.

In FIG. 13, the referenced files in reminder data base 1004 are copies of files existing in file data base 1006 at the time the multi-page snapshot was created. It is necessary to copy the files from files data base 1006 to reminder data base 104 to prevent subsequent changes to the files of files data base 1006 from being reflected in the multi-page snapshot.

Figure 14:
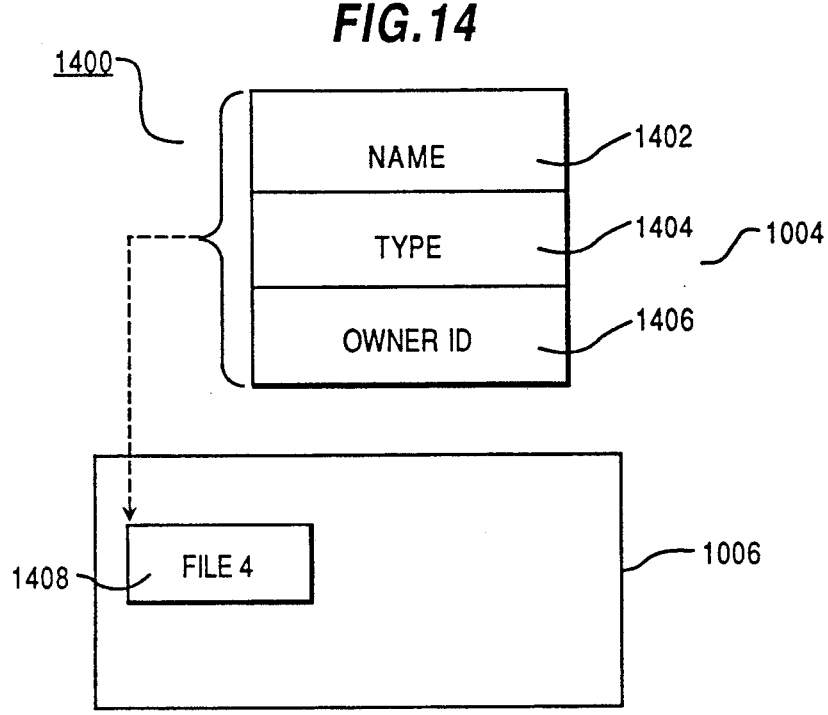
FIG. 14 is a diagram showing the variable portion of FIG. 11 in more detail and a second data base of FIG. 10.

In a reminder entry for an as-updated document, variable portion 1108 includes portions 1400 shown in FIG. 14. Portions 1400 include a name portion 1402, a type portion 1404, and an owner ID portion 1406. As described above, name portion 1402, type portion 1404, and owner ID portion 1406 serve to identify the as-updated file saved by the user, e.g., file4 1408 of FIG. 14. Because portions 1400 contain only a pointer to the as-updated file, not a copy of the file itself, any updates performed on, for example, file4 1408, in the ordinary course of executing processes will be reflected when the reminder is later accessed and file4 1408 is displayed.

As discussed above, an as-updated file can also be a multi-page file. If the as-updated screen display saved as a reminder is a multi-page file, file4 1408 in file data base 1006 preferably includes pointers to any subsidiary files needed to redisplay the entire multi-page file when the reminder is viewed. Alternately, the format of FIG. 14 could include a list of subsidiary documents, similar to list of subsidiary documents 1308 of FIG. 13, or could include some other data linking all needed documents of the as-updated multi-page document.

Figure 15:
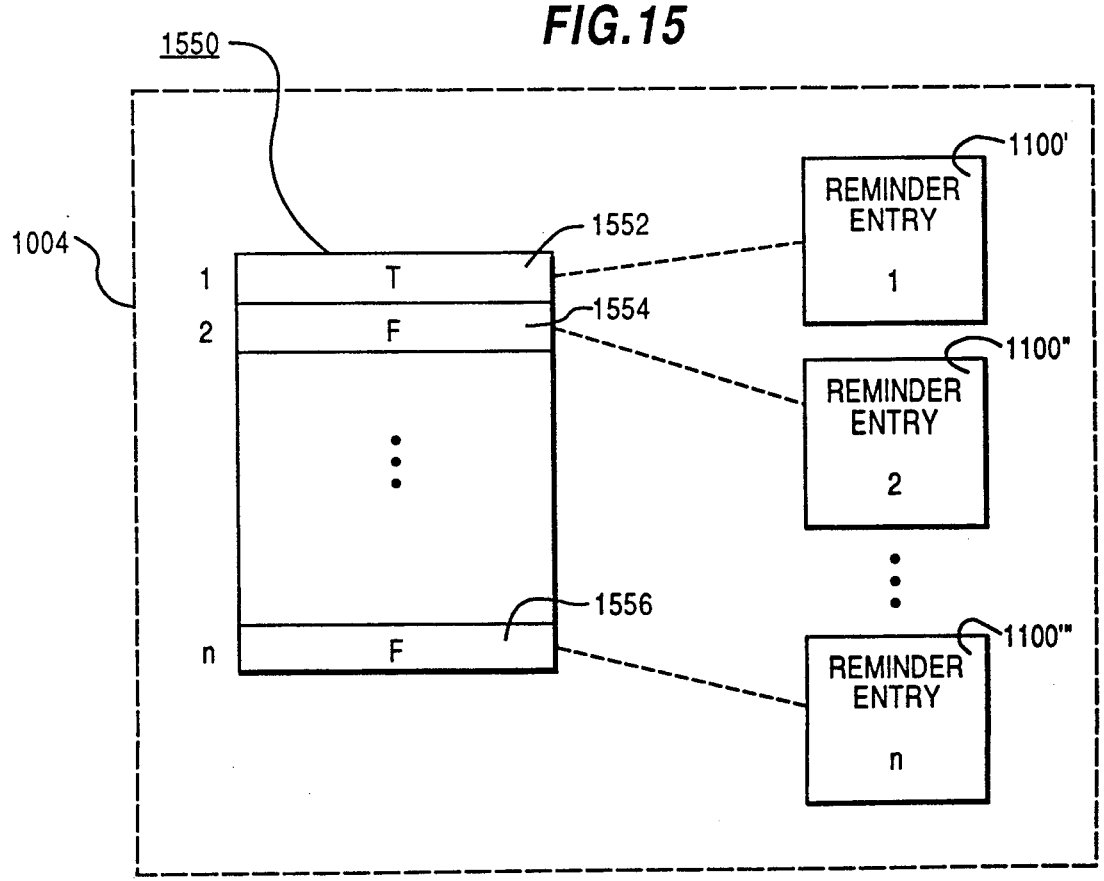
FIG. 15 is a diagram showing a read table in the first data base of FIG. 10.

FIG. 15 shows a read table 1550, which is stored in reminder data base 1004. Read table 1550 keeps track of whether a reminder has been viewed (also called "read") by the user. Read table 1550 includes entry1 1552, entry2 1554, and entryn 1556. Entries 1552–1556 correspond to reminder entries 1100', 1100'' and 1100''', respectively. As described below, reminders, stored in reminder entries 1100, can be viewed (read) by a user. Each entry 1552–1554 of read table 1550 includes a Boolean value of "T" (true) or "F" (false), indicating whether the reminder of a corresponding reminder entry has been viewed. For example, in FIG. 15, entry1 1552 includes a Boolean value "T," indicating that the reminder of reminder entry 1100' has been viewed. Similarly, entries 1554 and 1556 include Boolean values of "F," indicating that their corresponding reminder entries have not been viewed.

In a preferred embodiment of the invention, read table 50 is implemented as an index table and stores location, size, and other information for each reminder entry, including whether the reminder entry has been read. Thus, dotted lines are used in FIG. 15 to indicate that each entry in the read table indicates a corresponding reminder entry.

Reminder Alerts

Once a reminder has been stored, it is necessary to alert the user when the day for which the reminder was stored arrives. Both when the computer is turned on and, in a periodic manner, if the computer is operated continuously for more than one day, the software searches the stored reminder entries in reminder data base 1004 to determine whether any reminders have been stored for the current day. This determination is made by checking date portion 1101 of each reminder entry. In a preferred embodiment, this search is done daily. The method used to search the reminders may be any of a number of well-known search algorithms and will not be described in detail here.

Figure 16:
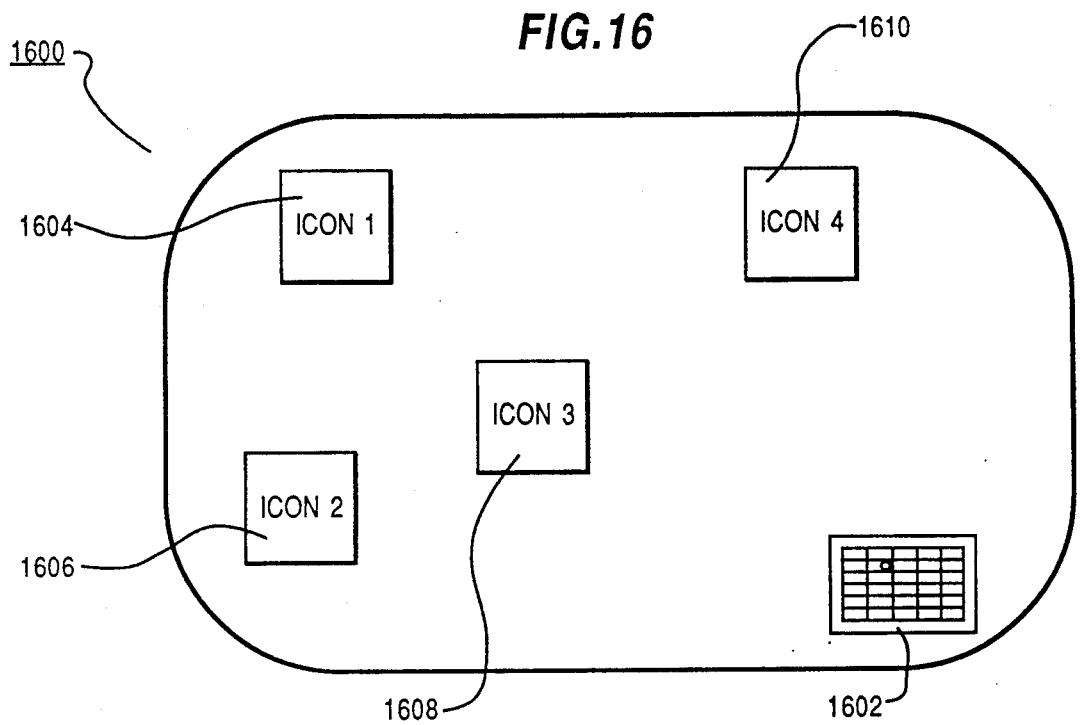
FIG. 16 a representation of a screen display including a "REMINDER ALERT"" icon.

If it is determined during the search that one or more reminders have been saved for the current day, a screen display 1600 is displayed. Screen display 1600 includes a "REMINDER ALERT" icon 1602. Display 1600, as shown in FIG. 16, also includes various icons which are shown for purposes of example and which will not be described herein, i.e., icon1 1604, icon2 1606, icon3 1608, and icon4 1610. It will be understood that screen display 1600 is shown by way of example only, to illustrate that "REMINDER ALERT" icon 1602 is displayed when reminders have been saved for the current day Icons 1604–1610 can be any icons, and screen display 1600 may display any other information besides "REMINDER ALERT" icon that is appropriate to the circumstances.

If the user touches "REMINDER ALERT" icon 1602, the reminders for the current day and all overdue reminders are displayed as described below. Otherwise, the reminders for the current day will remain in reminder data base 1004 unchanged. These reminders remaining in the data base will be detected by the next search performed on a subsequent day.

Reminder Review

Figure 17:
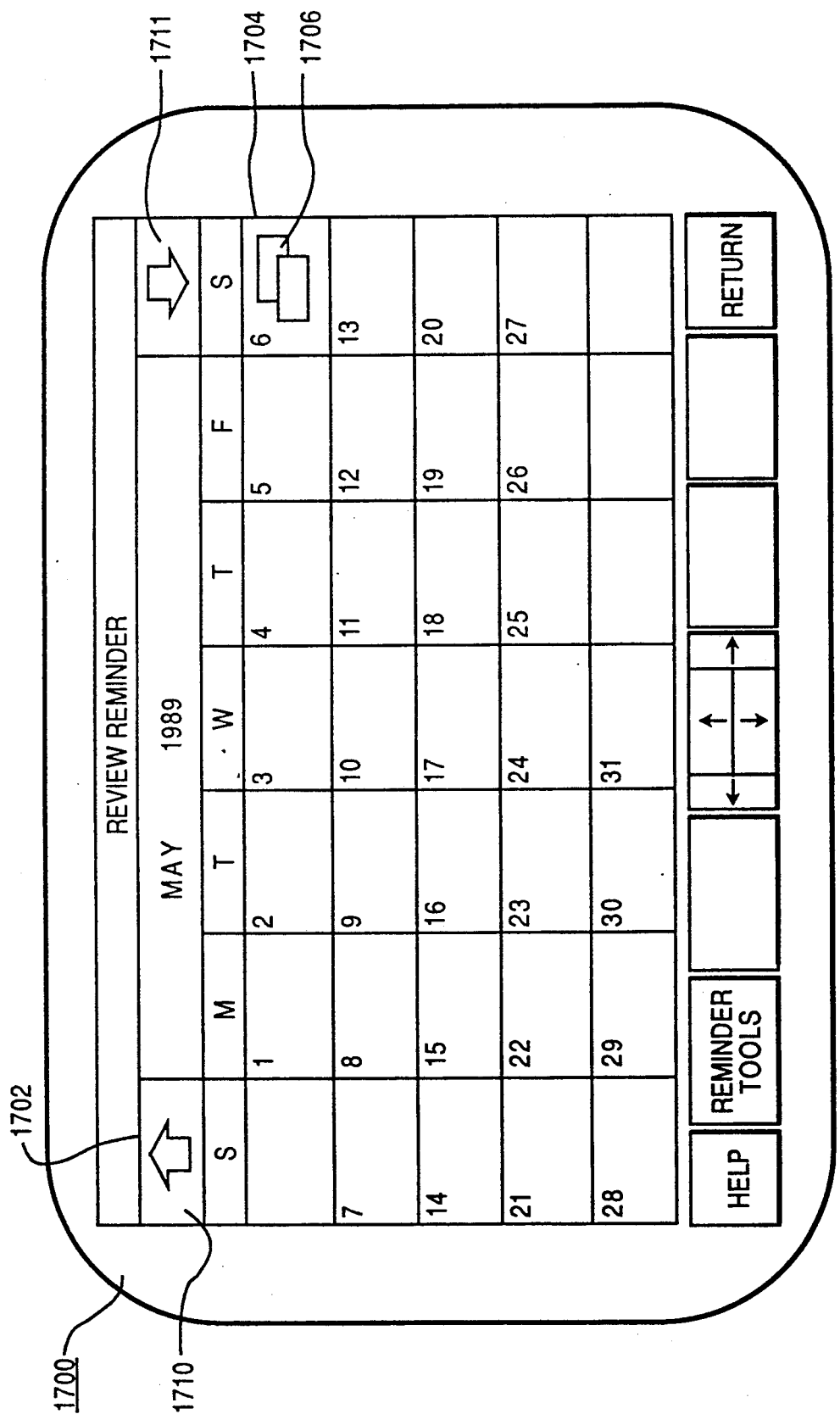
FIG. 17 is a representation of a screen display including a reminder calendar and various reminder button icons.
Figure 18:
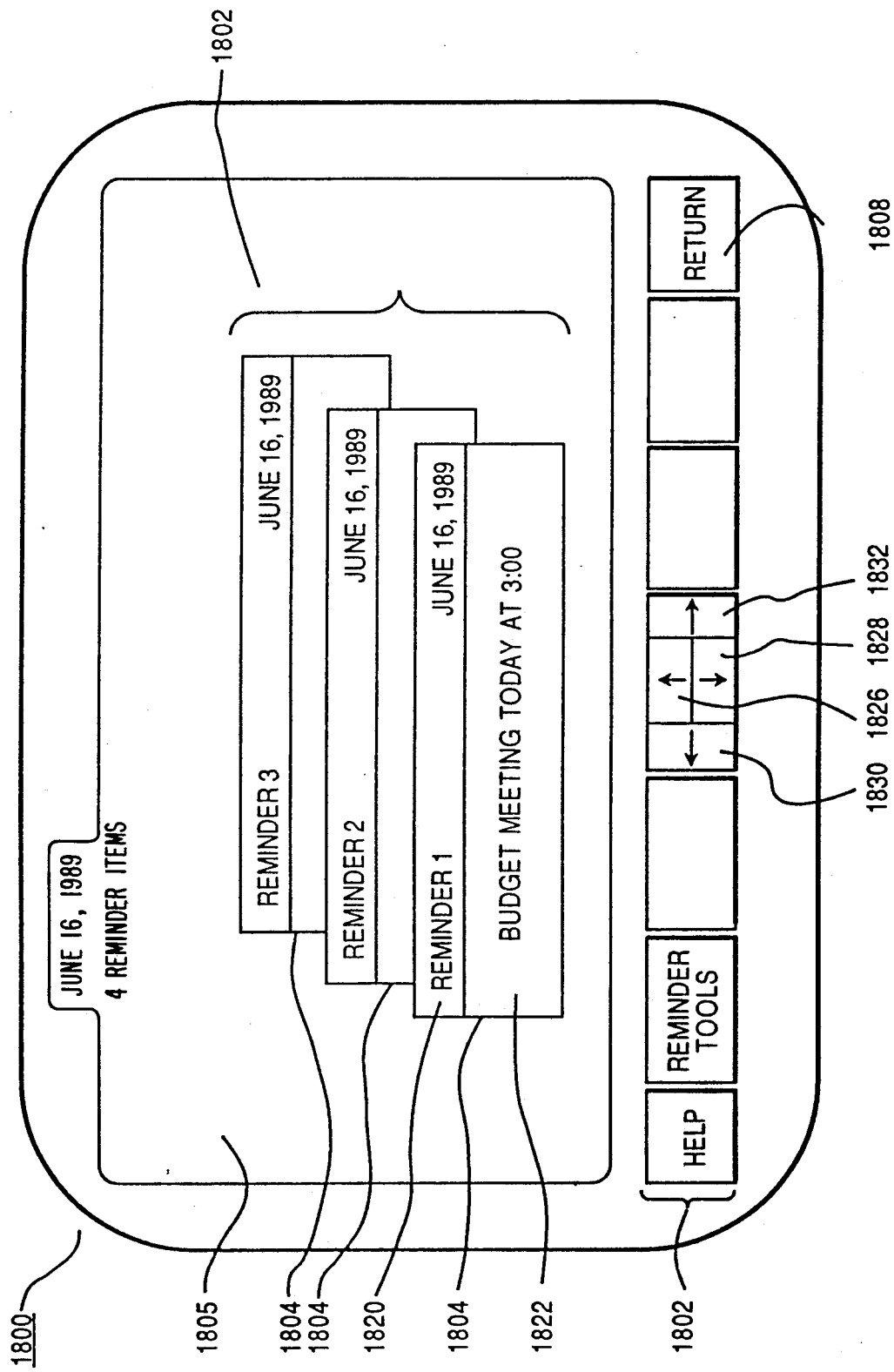
FIG. 18 is a representation of a screen display including a "stacked pages" menu.

Screen display 1800 of FIG. 18 allows the user to view reminders stored for any date after and including the current date. There are preferably four ways to reach screen display 1800 of FIG. 18. First, screen display 1800 is displayed when the user touches "REMINDER ALERT" icon 1602 of FIG. 16. Second, the user can touch a "hotspot" icon created by a method not important to this invention and displayed outside the Reminder application. Touching a hotspot icon causes display of a screen display 1700 of FIG. 17, which allows the user subsequently to display screen display 1800 as described below. Third, the user can touch "TOOLS" button icon 112 of FIG. 1, subsequently touch a "PATH" icon on a "TOOLS" display screen (not shown), and then touch a "REMINDER" button icon of a "PATH" display screen (not shown). Touching the "REMINDER" button icon causes display of a screen display 1700 of FIG. 17, which allows the user subsequently to display screen display 1800 as described below. Fourth, touching "REMINDER TOOLS" button icon 514 or 912, and subsequently touching the "AUDIT" icon causes screen display 1700 to be displayed.

Screen display 1700, which is reached from screen display 100, from screen displays 500 and 900, or by hotspot icons, as described above, is similar to screen display 500 of FIG. 5, except that different button icons are included at the bottom of screen displays 500 and 1700 and a different message ("REVIEW REMINDER") is displayed at the top of the screen display 1700. Display 1700 includes a reminder calendar 1702, having blocks for individual days of the month. When screen display 1700 has been invoked from "REMINDER ALERT" icon 1602, the date block of calendar 1702 representing days having reminders 1704 is displayed using an identifying color surrounding the date box. Block 1704 contains a double page symbol 1704. The current date is displayed in larger and different colored text than the other blocks in FIG. 17.

The user views the reminders for a day (which may or may not be the current day) by touching the block of calendar 1702 representing that day. Future months can be displayed by using arrow button icons 1710 and 1711. These future months are displayed in the same manner as calendar 1702.

When a block of calendar 1702 corresponding to a current day is touched, a screen display 1800, such as shown in FIG. 18, is displayed. Screen display 1800 allows a user to review reminders created for a current day and reminders for previous days. Date boxes of calendar 1702 corresponding to days previous to the current day are not enabled and touching date boxes of previous days has no effect. Touching a date box of calendar 1702 that corresponds to a day subsequent to the present day causes display of a display screen (not shown) similar in appearance to FIG. 18.

Screen display 1800 includes a "stacked pages" menu 1802 including a plurality of reminder items 1804. Each reminder item 1804 corresponds to one entry in reminder data base 1004 that contains the selected date in date portion 1101. For a current date, each reminder item 1804 corresponds to one entry in reminder data base 1004 that corresponds to today's date or previous dates. Each reminder item 1804 includes a header 1820, which includes a reminder number ("Reminder1, " "Reminder2," etc.), and a body 1822, which includes the beginning of the text of a Note-It stored in note text portion 1106 of the entry.

Figure 19:
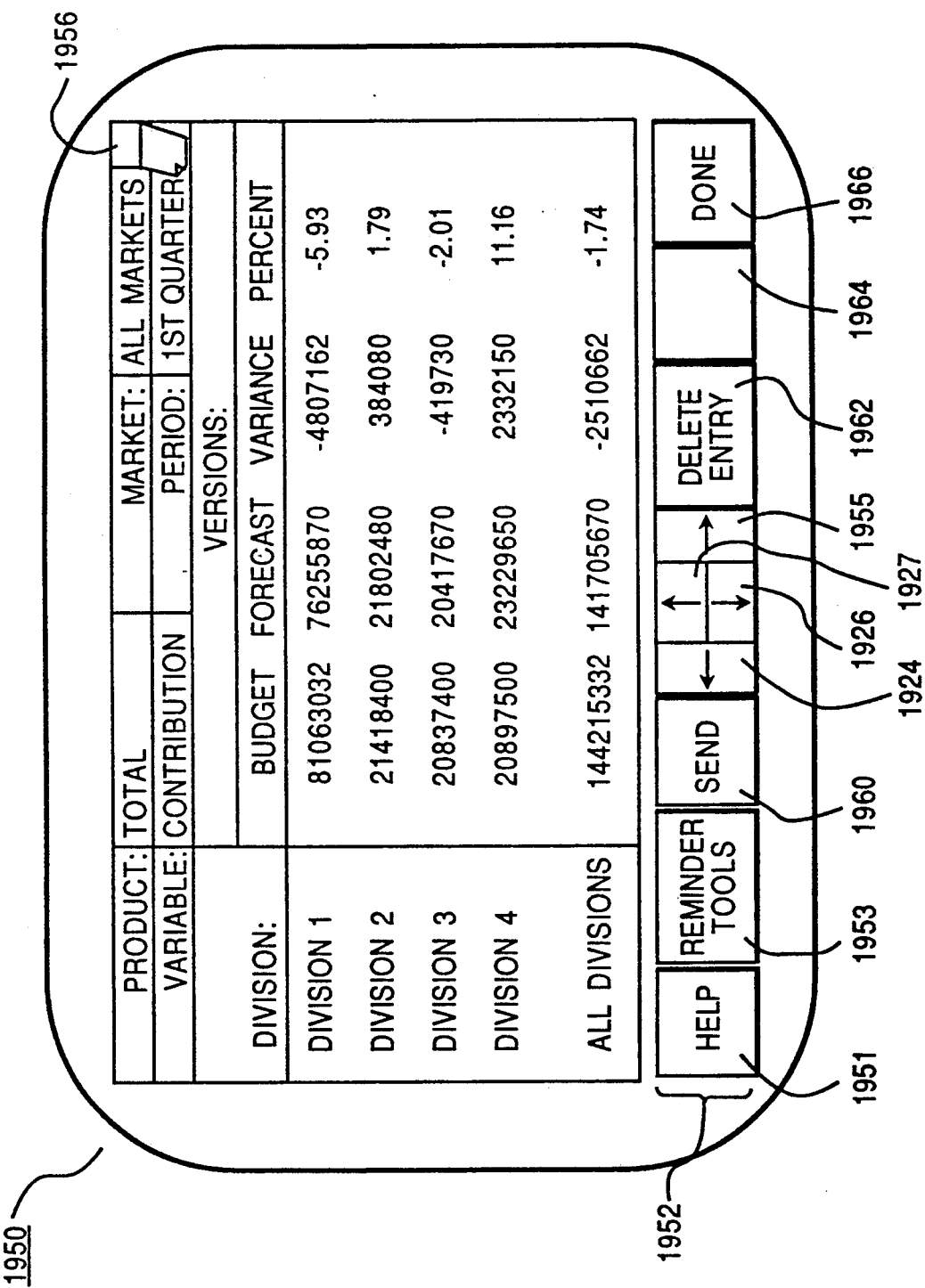
FIG. 19 is a representation of a screen display including a view of a reminder.

When a reminder item 1804 is touched, a screen display 1950, as shown in FIG. 19 is displayed. This is accomplished by accessing the reminder data base 1004 entry, and retrieving the file or files required to recreate the saved reminder corresponding to the touched reminder item 1804. The reminder may be any of a saved Note-It, screen display, or screen display and associated Note-It and maybe stored in any of the five previously discussed types. Screen display 1950, shown by way of example, shows a screen only snapshot reminder created from the Execu-View screen of FIG. 1. Thus, FIG. 19 shows a snapshot reminder that reflects an Execu-View report at a time the reminder was saved.

Screen display 1950 includes button icons 1952 similar to button icons 102 of FIG. 1, except for a "REMINDER TOOLS" button icon 1953, a "DELETE ENTRY" button icon 1962, a blank button icon 1964, and a "DONE" button icon 1966. Touching "DELETE ENTRY" button icon 1962 causes the reminder currently being displayed to be deleted from reminder data base 1004, and screen display 1800 to be displayed once again. Once a reminder item has been viewed and deleted, that reminder item is no longer displayed in FIG. 1800. Touching "DONE" button icon 1966 does not delete the reminder item being viewed, but displays FIG. 18 once again. Screen display 1950 also includes a small Note-It icon 1956 in the upper right-hand corner. Note-It icon 1956 operates in a manner similar to icon 906 of FIG. 9, in that touching icon 1956 will cause a Note-It associated with the displayed reminder to be displayed.

Once a reminder has been viewed (read), as shown in FIG. 19, an entry of "true" is stored in the entry in read table 1550 that corresponds to the viewed reminder. For example, FIG. 15 shows that a reminder corresponding to entry1 1552 has been viewed, since entry1 1552 includes a value of "T."

Once a reminder has been viewed, but not deleted, the reminder item header 1804 corresponding to the viewed reminder is displayed in a different color in FIG. 18 if the item correspond to the current date. In a preferred embodiment, reminder items 1804 for the current date are displayed with blue headers until they are touched (and viewed), after which they are displayed with grey headers. For dates other than today, headers are always blue. This coloring, however, is highly arbitrary.

Reminder items 1804 can be scrolled by scrolling arrow icons 1826 and 1828. (Although arrow icons 1830 and 1832 are displayed, they are preferably inoperable.) Touching scrolling arrow 1828 causes a front reminder item, for example, Reminder1, to disappear, allowing additional reminder items, for example, Reminder2, and Reminder3 and a first part of a Note-It of Reminder2 to be displayed. Thus, it is possible to view the beginning Note-Its associated with Reminder2, and Reminder3 of FIG. 18 by using scrolling arrow icon 1828. In the above example, touching scrolling arrow icon 1826 causes Reminder1 to reappear in front of Reminder2 to restore screen display 1800 to its original appearance.

A reminder item can be saved for viewing at a future date by touching a "SEND" button icon 1960 as described above in connection with FIGS. 1-9.

Periodic Updates

At periodic intervals, the present invention performs various housekeeping routines on the saved reminder messages in reminder data base 1004. These routines are preferably performed at a time of low system usage, such as early morning. The routines performed may include reminder rollover and garbage collection.

Figure 20:
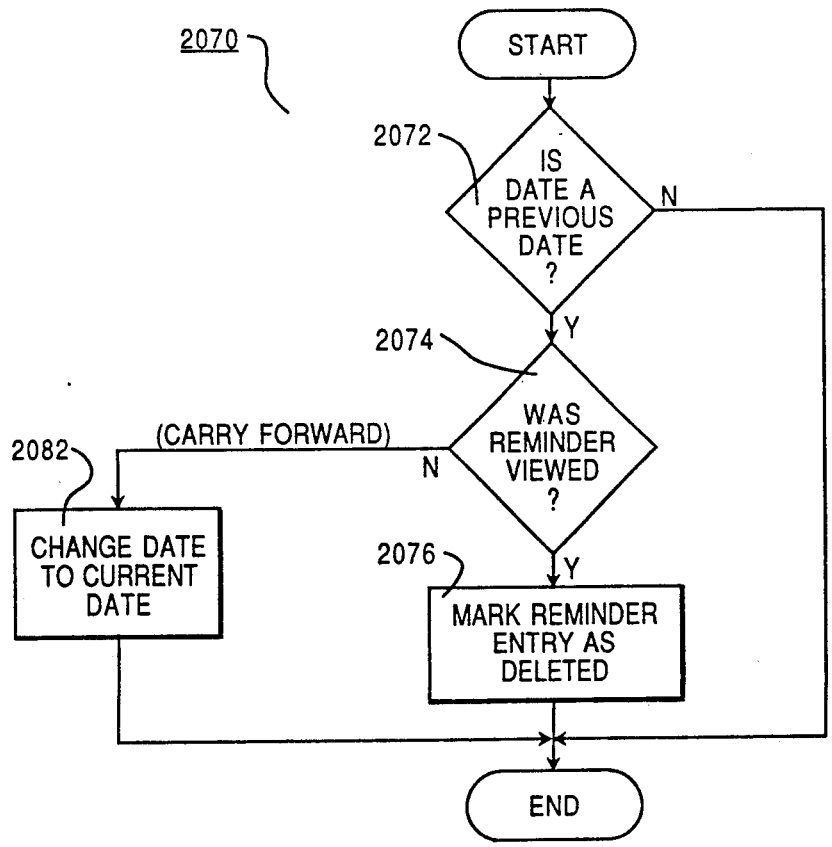
FIG. 20 is a flow chart showing a periodically performed "rollover" process.

FIG. 20 is a flow chart 2070 showing the "reminder rollover" routine, which deletes viewed reminders for previous days and which carries over reminders that were not viewed, so that they will be displayed for the current date. Flow chart 2070 includes steps 2072-2082. The rollover routine is preferably stored in memory 1002 as a computer program and performed by CPU 1010 at the beginning of a current day. Steps 2072-2082 preferably are performed for each reminder entry in the reminder data base 1004. If, in step 2072, the date portion 1101 of the reminder entry contains a previous date, i.e., a date prior to the current date, and if, in step 2074, read table 1550 indicates that the reminder has been viewed then the reminder entry is deleted in step 2076.

If, in step 2074, the date is that of a previous day, but the reminder has not been viewed, control passes to step 3082. In step 3082, date portion 1101 of the reminder entry is changed to the current date. This action ensures that the reminder will be displayed during the reminder alert process.

Once the rollover process is complete, a garbage collection routine of a type well-known in the art is performed. The garbage collection routine acts to consolidate the storage of reminder data base 1004. Thus, the garbage routine improves the storage efficiency of reminder data base 1004.

Operation

FIGS. 21-31 show a preferred control flow in which the screen displays of FIGS. 1-9 and 16-21 are displayed. This control flow is preferably embodied in a computer program stored in memory 1002 and executed by CPU 1010.

FIG. 21 shows a flow chart 2100, including steps 2102-2106 and screen displays 100 and 200. In step 2102, execution of a current process is begun, and screen display 100 (or some other current screen) is displayed. Once it is determined, in step 2104, that "SEND" button icon 110 of screen 100 has been touched, screen display 200 is generated. Alternately, if step 2106 determines that "TOOLS" icon 112 of screen 100 was touched, control passes to connector B of FIG. 28. Actions taken by the present invention when the other button icons of screen display 100 are touched will not be discussed herein, and are represented by the "No" branch of step 2106. After screen display 200 is generated, control passes to connector A of FIG. 22.

Figure 22:
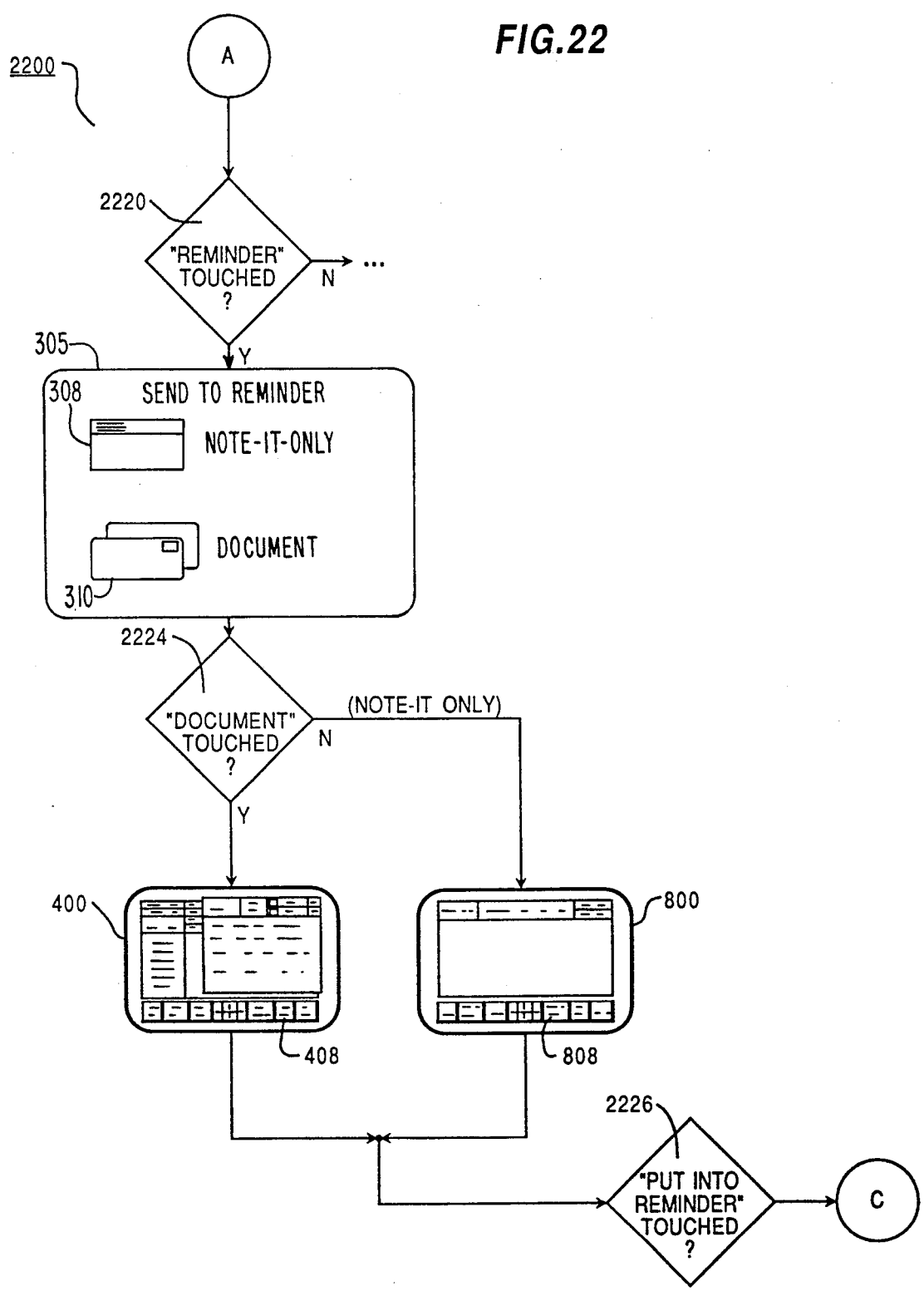
FIG. 22 is a continuation of the flow chart of FIG. 21, showing the steps required to initiate storage of a screen display reminder or a Note-It reminder.

FIG. 22 is a continuation of the flow chart of FIG. 21, showing a flow chart 2200, which includes step 2220-2226 and screen displays 305, 400, and 800. If step 2220 determines that "REMINDER" icon 206 (or some similar icon) has been touched, screen display 305 is generated unless the system is configured so as to not display screen display 305 as discussed above. If step 2224 determines that "DOCUMENT" icon 310 of screen display 305 has been touched, screen display 400 is displayed. The user enters a reminder and an associated Note-It by way of screen display 400. Otherwise, if "NOTE-IT-ONLY" icon has been touched, screen display 800 is displayed. As explained above, the user enters a Note-It-Only reminder by way of screen display 800. When step 2226 determines that "PUT IN REMINDER" button icons 408 or 808 have been touched, control passes to connector C of FIG. 23.

Figure 23:
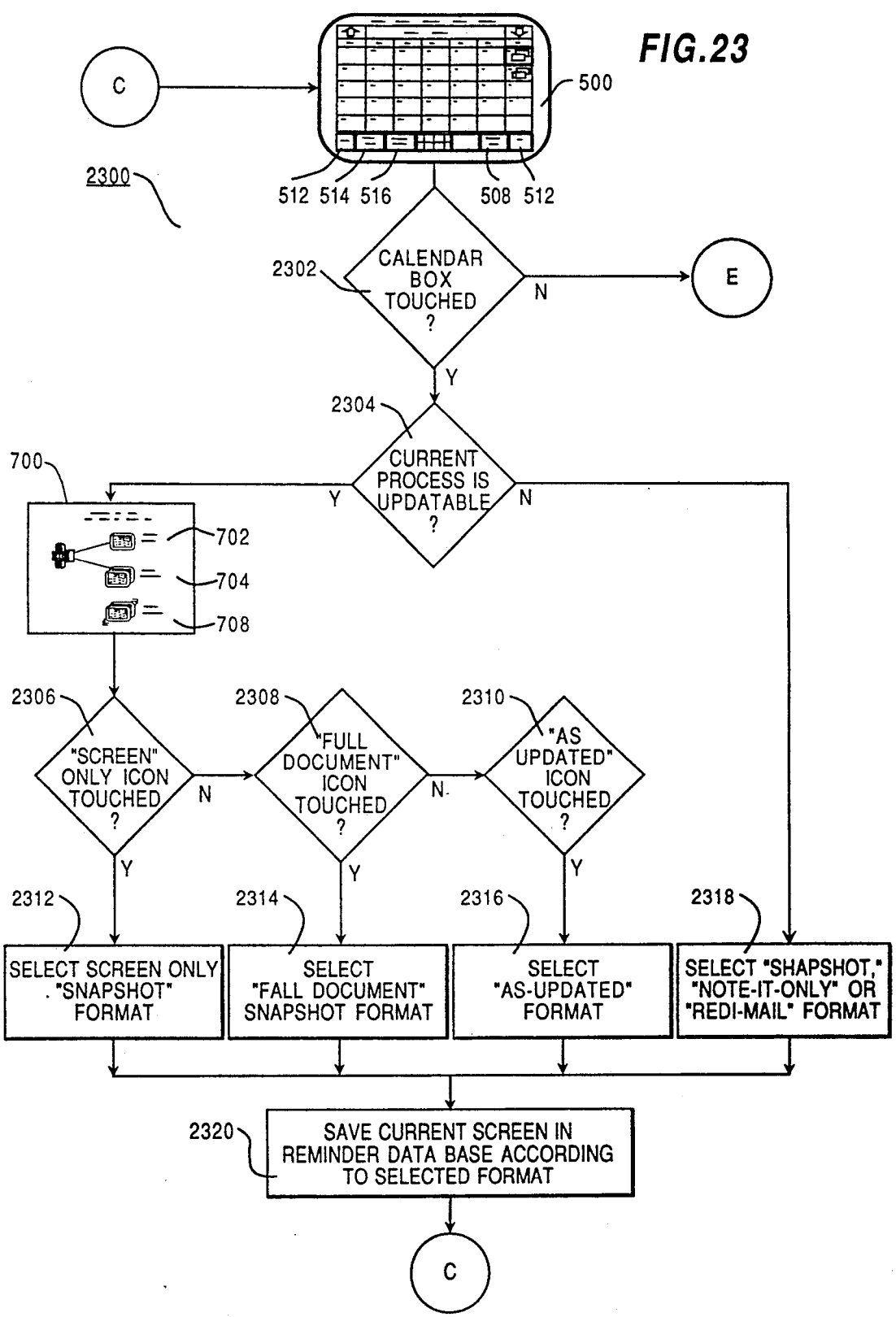
FIG. 23 is a continuation of the flow chart of FIG. 22, showing the steps to save various types of screen reminders, and the steps of selecting a format in which to save the reminder.

FIG. 23 is a continuation of the flow chart of FIG. 22, showing a flow chart 2300, which includes steps 2302-2320 and screen displays 500 and 700. Initially, screen display 500 is displayed. If step 2302 determines that a date box of screen display 500 has been touched, control passes to step 2304. Otherwise, control passes to connector E of FIG. 24.

In step 2304, if the current process is "updatable," then screen display 700 is displayed and control passes to step 2306. Otherwise, control passes to step 2318. Preferably, the present invention keeps track of the type of process that was running when the Reminder process was started. In a preferred embodiment, the Briefing Book is the only "updatable" process in existence. Only Briefing Book screen displays can be save in as-updated and multi-page snapshot formats. It is understood that other embodiments of the invention may include more than one "updatable" type.

Step 2306 determines whether "SCREEN ONLY" icon 702 was touched. If so, a screen only snapshot format is selected in step 2312. The screen of the current process will be saved. as a reminder in the snapshot format of FIG. 11. Step 2308 determines whether "FULL DOCUMENT" icon 704 was touched. If so, a full document snapshot format is selected in step 2314. The screen of the current process and other parts of the screen that can be viewed by scrolling will be saved as a reminder in the full document (multi-page) format of FIGS. 11 and 13. Step 2310 determines whether "AS-UPDATED" icon 708 was touched. If so, an as-updated format is selected in step 2316. The full document of the current process will be saved as a reminder in the as-updated format of FIGS. 11 and 14.

If step 2304 determines that the current process is not "updatable," step 2318 selects a format according to the current process. If the current process is Redi-Mail, a Redi-Mail format of FIGS. 11 and 12 is selected. If the current process is Execu-View, the screen only snapshot format of FIG. 11 is selected.

After a format has been selected, the current screen display (and other pages not displayed for screens stored in "full document" format) is saved as a reminder notice to be called on a day corresponding to the date box which detected in step 2302. Saving a reminder is described in more detail below. Control then passes to connector C of FIG. 23

Figure 24:
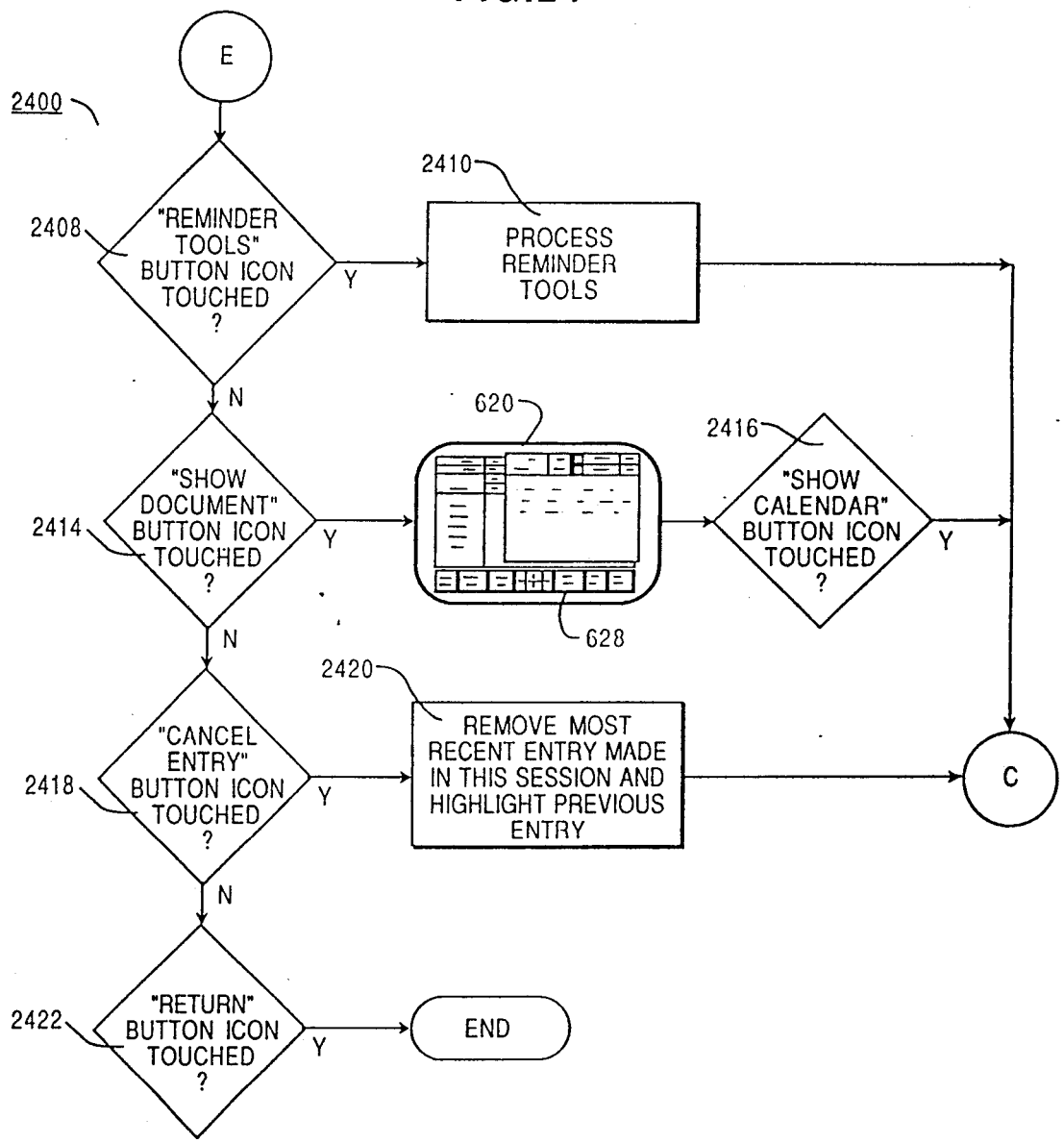
FIG. 24 is a continuation of the flow chart of FIG. 23, showing steps associated with the screen display of FIG. 4.

FIG. 24 is a continuation of the flow chart of FIG. 23, and shows a flow chart 2400, which includes steps 2402-2422 and screen display 620. In FIG. 24, decision steps 2402, 2408, 2414, 2418, and 2422 are shown in an arbitrary order for the sake of example. It is understood that these decision steps could appear in other orders without departing touched, control passes to connector C of FIG. 23.

In step 2408, if "REMINDER TOOLS" button icon 514 has been touched, a Tools screen, as described above, is displayed, and an reminder tool whose icon is touched is performed in step 2410.

Figure 8:
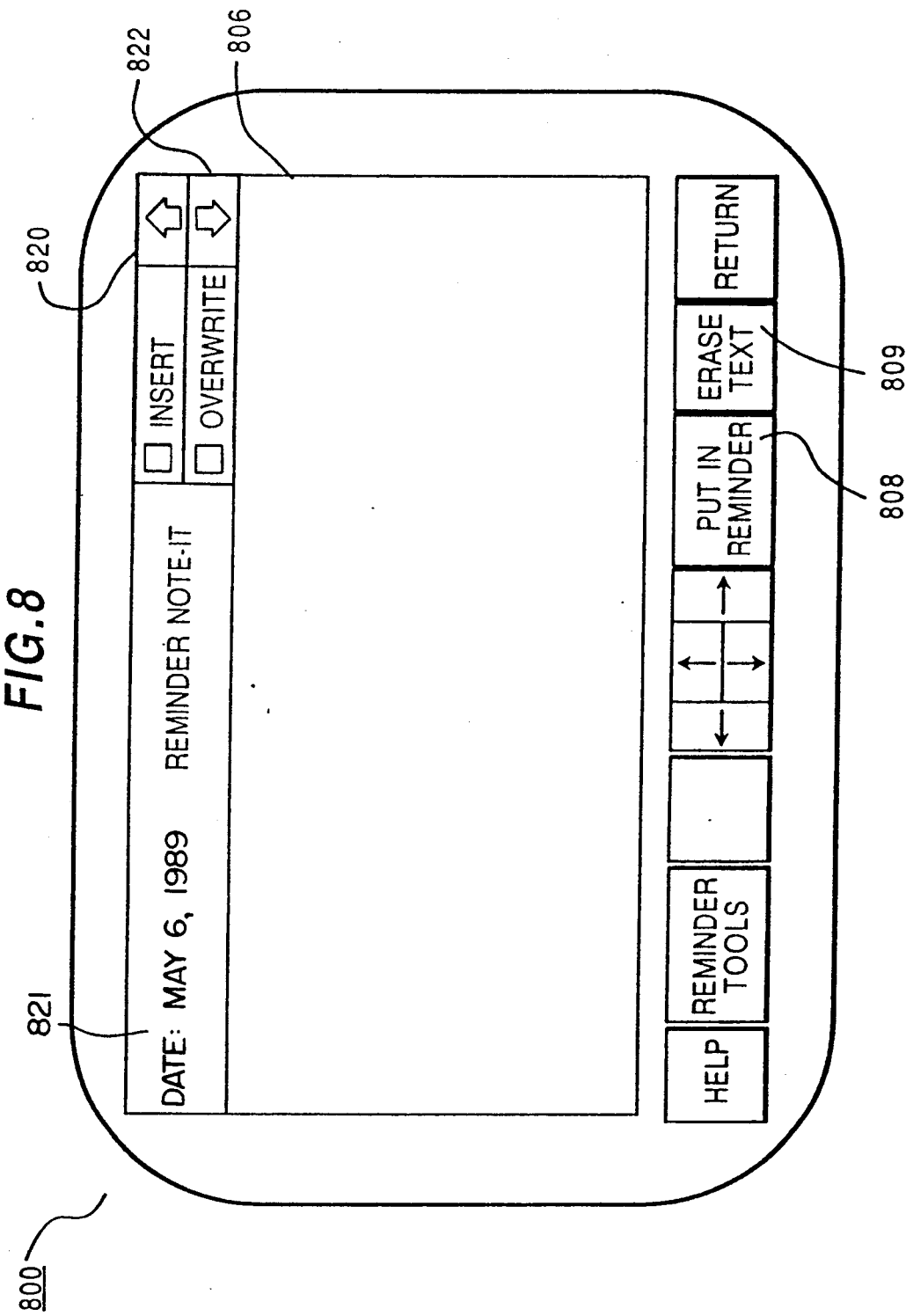
FIG. 8 is a representation of a screen display including a large Note-It area.

In step 2414, if "SHOW DOCUMENT" button icon 516 has been touched, screen display 620 is displayed. Although screen display 620 is shown including a small Note-It area, this Note-It area can be minimized, as described in connection with the Note-It icon of FIG. 9. Alternatively, if in step 2224, the "NOTE-IT-ONLY" icon 308 was touched, button icon 516 is labelled "SHOW NOTE-IT." If the user touches the "SHOW NOTE-IT" button icon, a full Note-It display as shown in FIG. 8 is displayed. Screen display 620 includes "SHOW CALENDAR" button icon 628. If step 2416 determines that "SHOW CALENDAR" button icon 628 has been touched, control passes to connector C of FIG. 23.

If step 2418 determines that "CANCEL ENTRY" button icon 508 has been touched, the most recent reminder entry is deleted from reminder data base 1004 and control passes to connector C of FIG. 23.

If step 2422 determines that "RETURN" button icon 512 has been touched, control returns to a process that was executing when "SEND" button 110 was touched. It is understood that this process could be a process other than that shown in FIG. 1.

Figure 25:
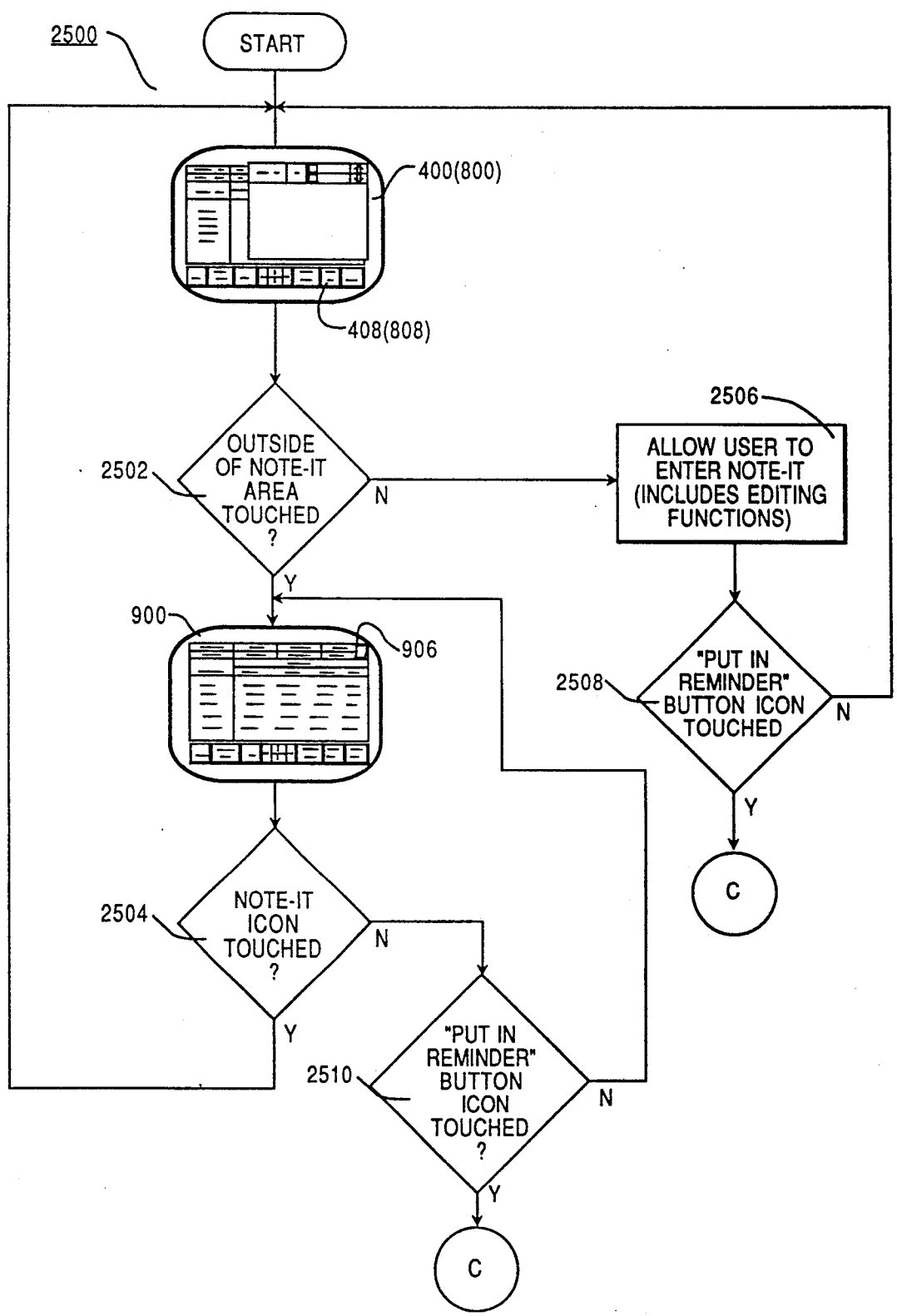
FIG. 25 is a flow chart showing the steps of entering a Note-it of FIG. 22 in more detail.

FIG. 25 is a flow chart 2500 showing steps associated with screen displays 400, 800 and 900 in more detail. Flow chart 2500 includes steps 2502-2510 and screen displays 400 and 900. Screen display 800 can be substituted for screen display 400. Screen display 400 is used to enter a Note-It associated with a screen display of a current process, while screen display 800 is used to enter a Note-It-Only. The steps of flow chart 2500 can be performed for either screen display 400 or 800, as indicated in FIG. 25. Although, for screen display 800, the determination in Step 2502 is always "NO", since screen display 800 cannot be reduced in size.

Once screen display 400 or 800 has been displayed, step 502 determines whether the user has touched the screen display 400 in an area outside the Note-It area 406 (This step is always "NO" for screen display 800). If so, it is assumed that the user wishes to view the screen under the Note-It area, and screen 900 including Note-It icon 906 has not been displayed. If step 2504 determines that Note-It icon 906 is touched, step 2510 determines whether "PUT IN REMINDER" button icon 408 has been touched. If so, control passes to connector C. If not, display screen 906 is still 1 displayed. After shrinking a Note-It area, the user may touch "PUT IN REMINDER" button icon to save a reminder, just as if the Note-It area was large.

The process waits for the user to enter a Note-It in step 2506. As discussed above, step 2506 includes various basic editing functions known to persons of ordinary skill in the art. After step 2506, control passes to connector C of FIG. 23 when the user touches "PUT IN REMINDER" button icon 408 (or "SHOW CALENDAR" button icon 628.)

Figure 26:
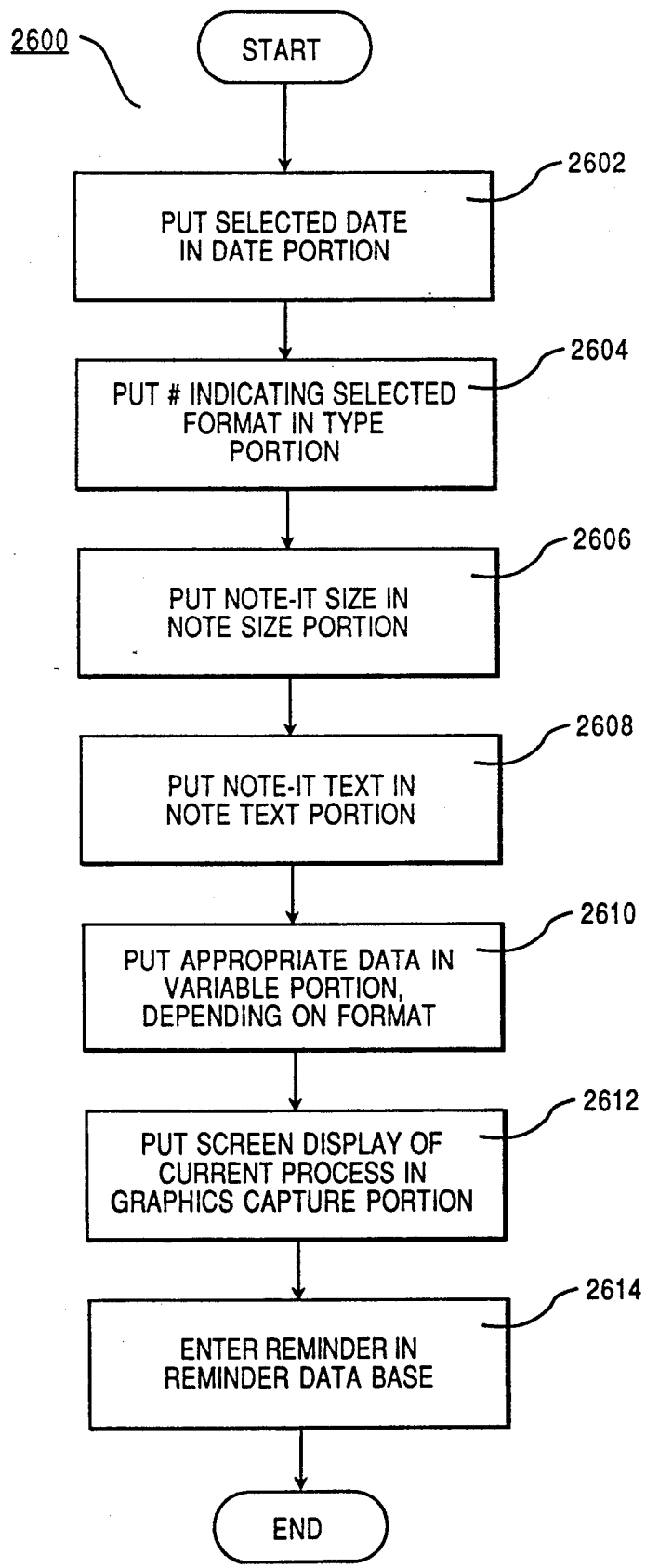
FIG. 26 is a flow chart showing the steps of saving a reminder of FIG. 13 in more detail.

FIG. 26 is a flow chart 2600 showing substeps of step 2320 of FIG. 23 in more detail. Thus, FIG. 26 shows detailed steps 2602-2614 for storing a current screen display or a Note-It-Only as a reminder entry in reminder data base 1004. Step 2602 stores a date corresponding to a selected calendar date box of calendar 502 in date portion 1101 of a reminder entry. Step 2604 stores a number indicating the format selected in one of steps 2312, 2314, 2316, and 2318 in type portion 1102. Step 2606 stores a Note-It size in note size portion 1104 if the user has chosen to enter a Note-It. Step 2608 stores the text of the Note-It as entered in step 2506. Step 2610 stores appropriate data in variable portion 1108, depending on the value stored in type portion 1102. Step 2612 stores graphics information defining the screen display of the current process in graphics capture portion 1108, unless the user has chosen to enter a Note-It-Only, in which case a null value will be entered in graphics capture portion 1108. Steps 2610 and 2612 are shown in more detail below. Step 2614 enters the reminder entry 1100 in reminder data base 1004 in a manner known to persons of ordinary skill in the art.

It is understood that the steps of flow chart 2600 are repeated if the user selects more than one date from calendar 502. In that case, a reminder entry is created and entered into reminder data base 1004 for each selected date. If the user stores one reminder multiple times, preferably, only step 2614 is repeated each time. (Unless the date or the text of the Note-It was changed, in which case steps 2602, 2606, and 2608 are also repeated.)

Figure 27:
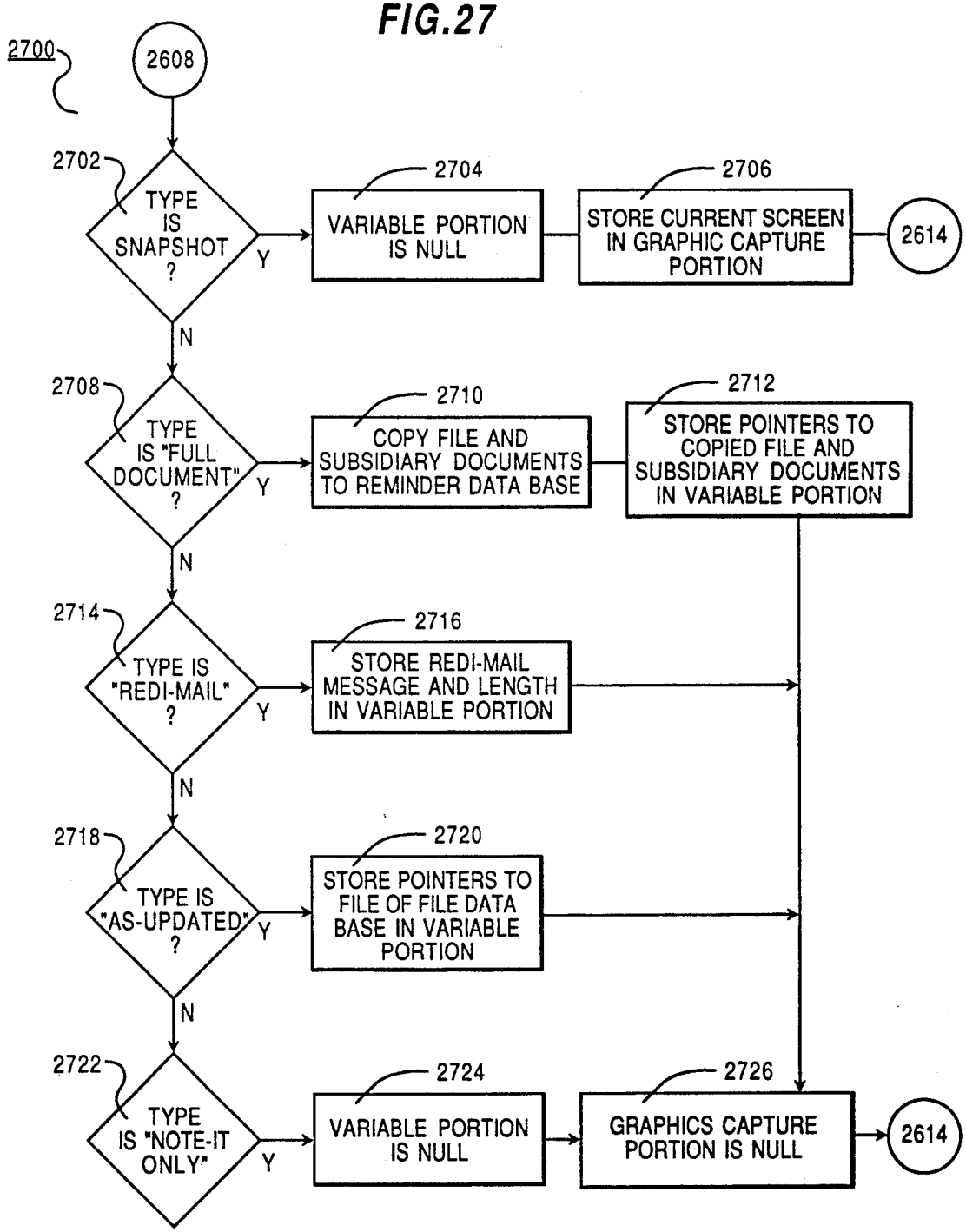
FIG. 27 is a continuation of the flow chart of FIG. 26, showing the data placed in a reminder entry depending on the format of the reminder.

FIG. 27 is a flow chart 2700 continuing the flow chart of FIG. 26, showing the data placed in a reminder entry when the reminder entry is created and saved. The data saved depends on the reminder format selected in FIG. 23. Flow chart 2700 includes steps 2702-2726.

If step 2702 determines that the selected type is "screen only snapshot," then a null value is stored in variable portion 1108 in step 2704, the currently displayed screen is stored in graphics capture portion 1110, and control returns to step 2614 of FIG. 26.

If step 2708 determines that the selected type is "full document," (snapshot) then the file and subsidiary documents that form the screen display are copied from file data base 1006 to reminder data base 1004 in step 2710, pointers to the copied files are stored in variable portion 1108, as shown in FIG. 11, and control passes to step 2726.

If step 2714 determines that the selected type is "Redi-Mail," then the current Redi-Mail message and its length are stored in variable portion 1108, as shown in FIG. 13 and control passes to step 2726.

If step 2718 determines that the selected type is "as-updated ," then pointers to the files used to display the as-updated file are stored in variable portion 1108 in step 2720, as shown in FIG. 14, and control returns to step 2726.

If step 2722 determines that the selected type is "Note-It Only," then a null value is stored in variable portion 1108 in step 2724, graphic capture portion 1110 is set to null, and control returns to step 2614 of FIG. 26.

Figure 28:
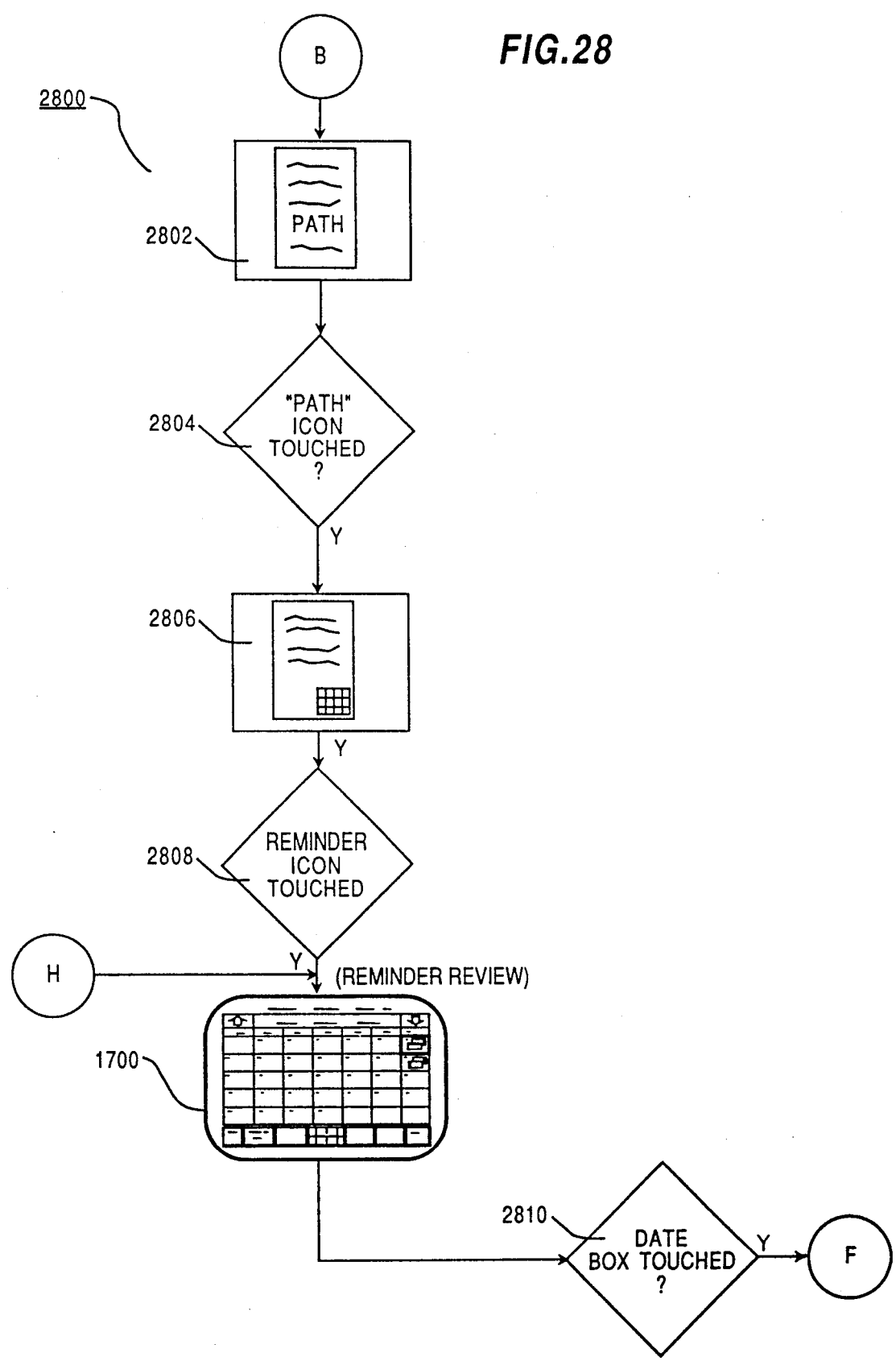
FIG. 28 is a flow chart showing a first method of entering a reminder review process.

FIG. 28 is a flow chart 2800 showing a first method of entering the reminder review process from screen display 100 of FIG. 1 Flow chart 2800 includes steps 2804, 2808, and 2810 and screen displays 2804, 2806 and 1700. Once "TOOLS" button icon 112 is touched, screen display 2802 is displayed. Screen display 2802 includes a "PATH" icon. If step 2804 determines that the "PATH" icon has been touched, a screen display 2806, including a reminder icon resembling a calendar is displayed. If step 2808 determines that the reminder icon was touched, screen display 1700 is displayed, and step 2810 waits for the user to touch a box of calendar 1702. Control also flow to connector H when the user touches "REMINDER ALERT" icon 1602 (see FIG. 29) or when the user selects "AUDIT" from "TOOLS" button icon 112 of FIG. 1. Once the user touches a date box, control passes to connector F of FIG. 29.

Figure 29:
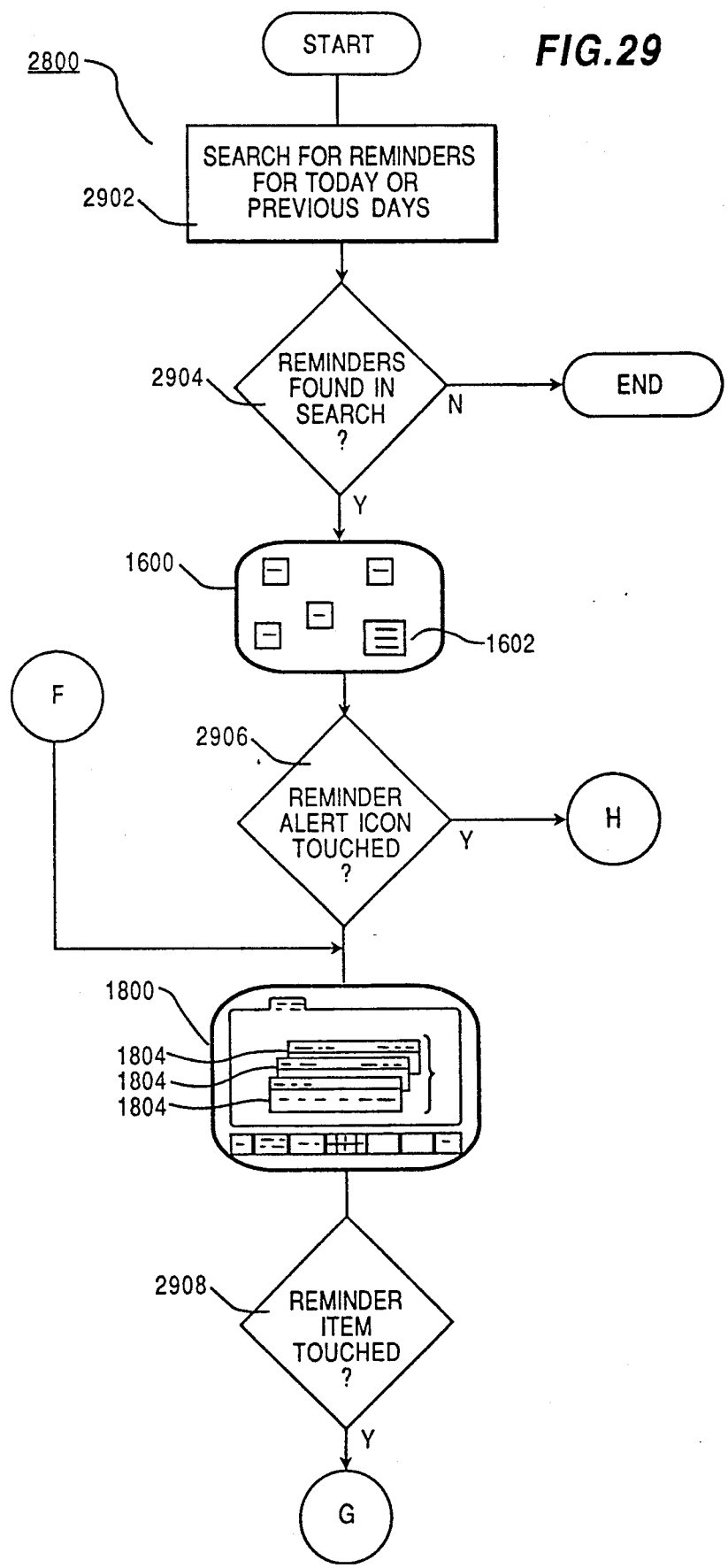
FIG. 29 is a flow chart showing a second method of entering a reminder review process through a reminder alert process, and also showing a reminder review process.

FIG. 29 is a flow chart showing a second method of entering the reminder review process through the reminder alert process, and also showing a reminder review process Flow chart 2900 includes steps 2902-2908 and screen displays 600 and 1800. In steps 2902 and 2904, if a search of date portions 1101 of each reminder entry finds reminders for the current day, then display screen 1600 is displayed, including reminder alert icon 1602. Otherwise, processing is ended. If step 2906 determines that reminder alert icon 1602 has been touched, display 1700 is displayed, including plurality of reminder items 1804. If step 2908 determines that a reminder item 1804 has been touched, control passes to connector G of FIG. 30.

FIG. 30 is a flow chart 3000, which is a continuation of the flow chart of FIG. 29 showing further steps of the reminder review process. Flow chart 3000 includes steps 3002–3008 and screen display 1900. Screen display 1900 lets the user view a reminder corresponding to a reminder item selected from screen display 1802. Step 3002 sets an entry in read table 1550 to "true" to indicate that the reminder corresponding to the entry has been viewed. When step 3004 determines that "DONE" button icon 3106 has been touched, control passes to conductor F of FIG. 29. Otherwise, if "DELETE ENTRY" button icon 1862 has been touched, an entry corresponding to the reminder being viewed is deleted from reminder data base 1004, and control passes to connector F of FIG. 29.

FIG. 31 is a flow chart 3100 showing a method of displaying a reminder to be viewed during the reminder review process. Flow chart 3100 includes steps 3102–3124. It is understood that steps 3102, 3106, 3112, 3116, and 3122 can be performed in any arbitrary order.

If step 3102 determines that type portion 1102 of a reminder entry in reminder data base 1004 is "screen only snapshot," then the graphic data stored in graphic capture portion 1110 is printed to display the reminder in step 3104.

If step 3106 determines that type portion 1110 is "full document snapshot," then in step 3108 pointers, for example a name, type, and owner ID, are retrieved from variable portion 1108, which has the format of FIG. 13, and step 3110 uses the files pointed to by the pointers to retrieve files from reminder data base 1004 and to reconstruct the multi-page reminder document, which is then displayed on the screen.

If step 3112 determines that type portion 1108 is "Redi-Mail," then step 3114 displays memo contents portion 1204 as the reminder document.

If step 3116 determines that type portion 1108 is "as-updated," then pointers are retrieved from variable portion 1108, which has the format of FIG. 12, and step 3120 uses the pointers to retrieve files from file data base 1006 to reconstruct the as-updated reminder document, which is then displayed on the screen.

If step 3122 determines that type portion 1108 is "Note-It Only," then note text portion 1106 of FIG. 11 is displayed as the reminder document.

Summary

The current invention can store a reminder message, without having to stop execution of a currently executing process. The reminder message is made up of a screen display that is generated by the current process. Thus, the user can store the screen display as a reminder without having to enter additional information, although such additional information may be entered through use of a Note-It reminder. In addition, a Note-It reminder only may be saved.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A method of creating a reminder notice file comprising the steps, performed by a data processing system, of:

executing a first software application in the data processing system, the first application generating information, at least some of which is displayed on a viewing screen;

generating, during the execution of the first application, a reminder request to execute a second application, which is a reminder application;

suspending execution of the first application in response to the reminder request; and executing the second software application, which is said reminder application and which is not part of the first application, in response to the reminder request, in order to store in the reminder notice file all or a portion of the information generated by the first application, including the displayed information, to be automatically signalled and recalled by the data processing system at a user specified future time.

2. A method of claim 2, further including the steps of:

producing at the specified future time a notification that the stored information of the first application is capable of being recalled to the viewing screen;

generating a display request to recall the stored information; and exhibiting the stored information of the first application on a viewing screen in the second application, which is the reminder application, in response to the generated display request.

3. A method of claim 1, wherein the step of executing the first application includes the step of exhibiting on the viewing screen one page of multiple pages of information that are capable of being exhibited one page at a time, and wherein the step of executing a second application, which is the reminder application, further includes the substep of:

storing information that will allow the multiple pages of information, including the displayed page, to be recalled at the specified future time in the second application, which is the reminder application.

4. A method of claim 1, wherein the step of executing the second application, which is the reminder application, includes the step of saving additional user-generated comments in association with the saved information in the reminder notice file.

5. A method of claim 1, wherein the step of executing the second application, which is the reminder application, includes the step of:

storing information in the reminder notice file that will allow an electronic mail message to be recalled at the specified time.

6. The method of claim 1, wherein the step of executing the first application includes the step of displaying at least a portion of the information as a mixed text and graphics display on the viewing screen, and wherein the step of executing the second application includes the step of executing the second application, which is the reminder application, to store information that will allow the mixed text and graphics display to be recalled at a future time.

7. The method of claim 1, wherein the step of generating a reminder request includes the substep of generating, during the execution of the second application which is the reminder application, a reminder request to present, at more than one specified future time, all or a portion of the information generated by the first application, including the displayed information.

8. A method of claim 2, wherein the first application generates and stores in the reminder notice file updatable information capable of being updated at a future time, wherein the step of executing the second application, which is the reminder application, further includes the substep of storing pointer information in the reminder notice file that points to the updatable information stored by the first application;

wherein the stored information is updated by the first application; and wherein the step of exhibiting the stored information in response to the generated display request further includes the step of exhibiting, by the second application, the stored updated information in accordance with the pointers in the reminder notice file.

9. A method of claim 2, wherein the first application generates information capable of being updated at a future time, and wherein the step of exhibiting information on the viewing screen, in the second application, which is the reminder application, in response to the generated display request further includes the step of:

exhibiting the information as it was when the step of executing the first application was originally executed without subsequent updating.

10. A method of claim 2, wherein the step of exhibiting the information in the second application, which is the reminder application, includes the substeps of:

displaying a list of reminder items which have not been read, using a first color, wherein each one of the reminder items refers to different information stored in the reminder file;

generating a display request indicating a selection of one of the list of displayed reminder items;

exhibiting on the viewing screen at least a portion of the stored information referred to by the selected reminder item; and changing the selected reminder item to a second color to indicate that the exhibited information has been read.

11. A method of claim 10, further including the step of deleting the stored information corresponding to the selected reminder item in response to a request to delete such information.

12. The method of claim 2, wherein the step of executing the first application includes the step of displaying the information as a graphics display on the viewing screen;

wherein the step of executing the second application, which is the reminder application, includes the step of executing the reminder procedure to store information that will allow the graphics display to be recalled at a future time in the second application, which is the reminder application; and further including the step of printing the redisplayed graphics display in the second application, which is the reminder application, so that the printed graphics display is substantially the same as the graphics display of the first application.

13. The method of claim 2, further including the step of sending the information recalled in the second application, which is the reminder application, at least a portion of which is exhibited on the viewing screen, to a user of the system via electronic mail in response to an externally generated send request.

14. An apparatus for creating a file of reminder notices, comprising:

means for executing a first software application in the data processing system, the first application generating information, at least some of which is displayed on a viewing screen;

means for generating, during the execution of the first application, a reminder request to execute a second application, which is a reminder application;

means for suspending execution of the first application in response to the reminder request; and means for executing the second software application, which is the reminder application and which is not part of the first application, in response to the reminder request in order to store in the reminder notice file all or a portion of the information generated by the first application, including the displayed information, to be automatically signalled and recalled at a user specific future time; and, means for automatically signalling and recalling the stored information at a user specific future time;

15. An apparatus of claim 14, further including:

means for producing at the specified future time a notification that the stored information of the first application may be recalled to the viewing screen;

means for generating a display request to recall the stored information; and means for exhibiting the stored information on a viewing screen, in the second application, which is the reminder application, in response to the generated display request.

16. An apparatus of claim 14, wherein the means for executing the first application includes means for exhibiting on the viewing screen one page of multiple pages of information that are capable of being exhibited one page at a time, and wherein the means for executing the second application, which is the reminder application, further includes:

means for storing information that will allow the multiple pages of information, including the displayed page to be recalled at the specified future time.

17. An apparatus of claim 14, wherein the means for executing the second application includes means for saving additional user-generated comments in association with the saved information in the reminder notice file.

18. An apparatus of claim 14, wherein the means for executing the second application includes:

means for storing information that will allow an electronic mail message to be recalled at the specified time.

19. An apparatus of claim 15, wherein the first application generates and stores in the reminder notice file information capable of being updated at a future time, and wherein the means for exhibiting further includes:

means for exhibiting updated information.

20. An apparatus of claim 15, wherein the first application generates information capable of being updated at a future time, and wherein the means for exhibiting further includes:

means for exhibiting the information as it was when it was first stored.

21. An apparatus of claim 15, wherein the means for exhibiting on the viewing screen includes:

means for displaying a list of reminder items which have not been read, using a first color, wherein each one of the reminder items refers to different information stored in the reminder file;

means for generating a display request indicating a selection of one of the list of displayed reminder items; and means for exhibiting on the viewing screen the selected reminder item in a second color.

22. An apparatus of claim 21, further including:

means for deleting the stored information corresponding to the selected reminder item in response to a request to delete such information.

* * * * *

UNITED STATES PATENT AND TRADEMARK OFFICE
CERTIFICATE OF CORRECTION

PATENT NO. : 5,165,012

DATED : November 17, 1992

INVENTOR(S) : RICHARD L. CRANDALL ET AL.

It is certified that error appears in the above-identified patent and that said Letters Patent is hereby corrected as shown below:

Claim 2, column 20, line 19, change "claim 2" to -- claim 1 --; and

Claim 14, column 22, line 19, change "time;" to -- time. --.

Signed and Sealed this

Twenty-sixth Day of October, 1993

Attest:

BRUCE LEHMAN

Attesting Officer   Commissioner of Patents and Trademarks